United States Patent
Shimada

(10) Patent No.: US 10,705,408 B2
(45) Date of Patent: Jul. 7, 2020

(54) ELECTRONIC DEVICE TO AUTOFOCUS ON OBJECTS OF INTEREST WITHIN FIELD-OF-VIEW OF ELECTRONIC DEVICE

(71) Applicant: SONY CORPORATION, Tokyo (JP)

(72) Inventor: Junji Shimada, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 16/162,920

(22) Filed: Oct. 17, 2018

(65) Prior Publication Data

US 2020/0124940 A1 Apr. 23, 2020

(51) Int. Cl.
G03B 13/36 (2006.01)
H04N 5/14 (2006.01)
G06T 7/20 (2017.01)
H04N 5/232 (2006.01)

(52) U.S. Cl.
CPC ........... *G03B 13/36* (2013.01); *G06T 7/20* (2013.01); *H04N 5/145* (2013.01); *H04N 5/23212* (2013.01)

(58) Field of Classification Search
CPC ...... G03B 13/36; G06T 7/20; H04N 5/23212; H04N 5/145
USPC .......................................................... 348/169
See application file for complete search history.

(56) References Cited

U.S. PATENT DOCUMENTS 9,317,777 B2   4/2016 Kaasila et al.
2005/0195278 A1  9/2005 Nair
2010/0045800 A1  2/2010 Chebil et al.
2015/0358552 A1* 12/2015 Kobayashi ........... H04N 5/2355 348/239
2016/0094774 A1* 3/2016 Li ....................... H04N 5/23212 348/222.1
2018/0197017 A1* 7/2018 Mansour ............ G06K 9/00778

OTHER PUBLICATIONS

Badri Narayana Patro, "Design and Implementation of Novel Image Segmentation and BLOB Detection Algorithm for Real-Time Video Surveillance Using DaVinci Processor", International Conference on Advances in Computing,Communications and Informatics (ICACCI), 2014 IEEE, pp. 1909-1915.
Withagen, et al., "Likelihood-Based Object Detection and Object Tracking using Color Histograms and Em", IEEE ICIP 2002, 04 pages.

* cited by examiner

*Primary Examiner* — Allen C Wong
(74) *Attorney, Agent, or Firm* — Chip Law Group

(57) ABSTRACT

An electronic device to autofocus on an object-of-interest within a field-of-view of the electronic device, includes an image sensor and a circuitry. The image sensor captures a sequence of image frames that includes a current frame and detect at least one prominent region in the current frame. The detected at least one prominent region has an optical flow similar to a direction of motion of the electronic device. The circuitry selects a region-of-interest from the detected at least one prominent region and estimates an autofocus point in the detected at least one prominent region. The circuitry controls focus of the image sensor at the estimated autofocus point in the current frame. The focus of the image sensor is controlled such that the estimated autofocus point exhibits a minimum deviation from an initialized position for the estimated autofocus point within the detected at least one prominent region.

20 Claims, 10 Drawing Sheets

ELECTRONIC DEVICE TO AUTOFOCUS ON OBJECTS OF INTEREST WITHIN FIELD-OF-VIEW OF ELECTRONIC DEVICE

REFERENCE

None.

FIELD

Various embodiments of the disclosure relate to camera and object tracking technologies. More specifically, various embodiments of the disclosure relate to an electronic device to autofocus on a desired object of a plurality of moving objects within a field-of-view of the electronic device.

BACKGROUND

Recent advancements in the field of camera technology have led to the development of various methods and techniques for automatic adjustment of focus of cameras. A conventional camera may autofocus on one or more objects located at a center portion of a field-of-view of the conventional camera. In certain scenarios, a conventional camera may be utilized by a user to focus at certain regions of an object of interest that moves with a group of moving objects in the field-of-view. At different time points, the object of interest may be different or the same object of interest may appear in different regions of a scene in the field-of-view of the conventional camera. In cases where the object of interest may appear in regions different from a center portion of a scene in the field-of-view of the conventional camera, the object of interest may be erroneously autofocused by the conventional camera at undesired points.

Conventionally, estimation of autofocus points on a moving object requires multiple inputs from a user. For example, a conventional camera may be used by a user to follow movements of the object of interest. The lens arrangements of the conventional camera may be manually adjusted by the user while the conventional camera is moved to follow movements of the object of interest to capture detailed, artifact free, and focused shots of the object of interest. However, in different scenarios, the object of interest may change frequently in different scenes, for example, the object of interest may be a specific player in one scene and a sports item, for example, a ball, in the next scene. Therefore, it is difficult for the user that operates the camera to keep a track of different objects of interest and at the same time manually calibrate lens arrangements to maintain a focus at dynamically varying points or regions on different objects of interest.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device to autofocus on a desired object of a plurality of moving objects within a field-of-view of the electronic device is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
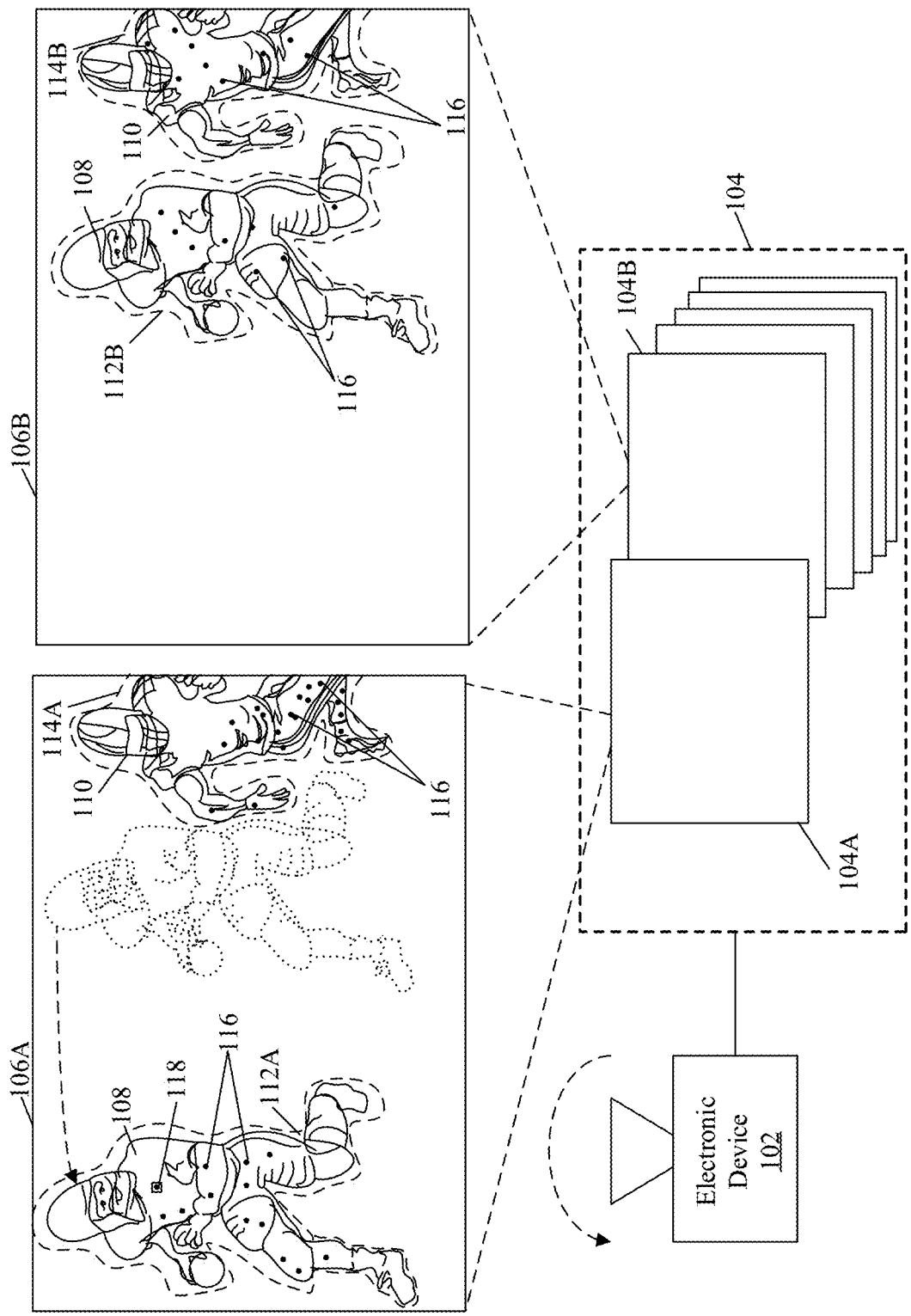
FIG. 1 is a block diagram that illustrates an exemplary environment for implementation of an electronic device to autofocus on a desired object within a field-of-view of the electronic device.

The following described implementations may be found in the disclosed electronic device to auto-focus on an object-of-interest within a field-of-view of the electronic device. Exemplary aspects of the disclosure may include an electronic device that may include an image sensor and a circuitry. The image sensor may be configured to capture a sequence of image frames which includes a current frame. The current frame includes a plurality of regions which corresponds to a plurality of moving objects within a field-of-view of the image sensor. The circuitry may be configured to detect at least one prominent region in the current frame, where the detected at least one prominent region has an optical flow similar to a direction of motion of the electronic device. Such detection may be done based on a threshold criteria. The detected at least one prominent region may include an object-of-interest in the plurality of moving objects. The circuitry may be further configured to select a region-of-interest from the detected at least one prominent region in the current frame. The region-of-interest may be selected based on prior information associated with a tendency of a user to focus in an upper and center portion of the object-of-interest in the detected at least one prominent region. Thereafter, the circuitry may be further configured to estimate an autofocus point in the detected at least one prominent region. The autofocus point may be estimated by computation of a center of mass of a portion of the object-of-interest in the selected region-of-interest from the detected at least one prominent region. The circuitry may be further configured to control a focus of the image sensor automatically at the estimated autofocus point in the current frame. The focus of the image sensor may be controlled such that the estimated autofocus point may exhibit a minimum deviation from an initialized position for the estimated autofocus point within the detected at least one prominent region.

In accordance with an embodiment, the circuitry may be further configured to generate an optical flow map of the current frame based on a difference of pixel values of a plurality of pixels in the current frame with respect to a previous frame in the sequence of image frames. The circuitry may be further configured to compute a motion vector associated with the electronic device, based on an optical flow-based motion vector and a motion sensor-based motion vector. The motion sensor-based motion vector may be computed, based on angular velocity information obtained from a sensor in the electronic device, such as a gyroscope based sensor.

In accordance with an embodiment, the circuitry may be further configured to extract from the generated optical flow map, a plurality of motion vectors associated with a plurality of points in the detected at least one prominent region. The circuitry may be further configured to compute a plurality of inner products between the motion vector associated with the electronic device and each of the plurality of motion vectors associated with the plurality of points in the detected at least one prominent region. A computed inner product of a motion vector associated with each of the plurality of points and the motion vector associated with the electronic device may represent a likelihood-of-prominence value associated with the respective point.

In accordance with an embodiment, the circuitry may be further configured to generate a threshold value from the computed plurality of inner products based on a maximum of the computed plurality of computed inner products. Thereafter, the circuitry may be further configured to determine whether a computed inner product associated with a motion vector at a point in the current frame is greater than the threshold value for the plurality of inner products. The determination based on the threshold value for the plurality of inner products is the threshold criteria for the detection of the at least one prominent region in the current frame. The at least one prominent region may be detected in the current frame based on selection of the plurality of points from the current frame that have an inner product value greater than the computed threshold value. In accordance with an embodiment, the region-of-interest is selected based on a search of a minimum and a maximum of coordinates of the detected at least one prominent region.

In accordance with an embodiment, the computation of the center of mass of the portion of the object-of-interest in the selected region-of-interest in the detected at least one prominent region may be done based on a plurality of computed inner products associated with a plurality of points in the detected at least one prominent region. The computed center of mass of the portion of the object-of-interest in the selected region-of-interest may be a candidate autofocus point. The circuitry may be further configured to determine whether the computed center of mass of the portion of the object-of-interest in the selected region-of-interest is present in the detected at least one prominent region. The determination of a presence of the center of mass in the detected at least one prominent region may be a first criteria for the estimation of the autofocus point in the detected at least one prominent region.

In accordance with an embodiment, the circuitry may be further configured to search for a new candidate autofocus point that may be separated by a minimum distance from the candidate autofocus point to the detected at least one prominent region. The new candidate autofocus point may be searched when the computed center of mass is present outside of the detected at least one prominent region. The circuitry may be further configured to determine whether a distance between the candidate autofocus point for the current frame and a candidate autofocus point in a previous frame is less than a threshold distance. The determination based on the threshold distance may be a second criteria for the estimation of the autofocus point in the detected at least one prominent region.

In accordance with an embodiment, the candidate autofocus point may be the estimated autofocus point in accordance with at least one of a first criteria and a second criteria. The circuitry may be further configured to segment the object-of-interest from the sequence of image frames based on the detected at least one prominent region and the estimated autofocus point.

FIG. 1 is a block diagram that illustrates an exemplary environment for implementation of an electronic device to autofocus on a desired object within a field-of-view of the electronic device, in accordance with an embodiment of the disclosure. With reference to FIG. 1, there is shown an environment 100 comprising an electronic device 102. The electronic device 102 may capture a sequence of image frames 104 that includes a current frame and a previous frame of a scene, for example a current frame 104A and a previous frame 104B for a scene of a football match. There is further shown a first enlarged view 106A of the current frame 104A and a second enlarged view 106B of the previous frame 104B.

The electronic device 102 may comprise suitable logic, circuitry, and interfaces that may be configured to autofocus on an object-of-interest (such as a first object 108 and a second object 110) within a field-of-view of the electronic device 102. The electronic device 102 may include image sensors to capture the sequence of image frames 104 and/or motion sensors to detect a motion vector of the electronic device 102. Examples of the electronic device 102 may include, but are not limited to, an imaging device (such as a digital camera, a camcorder), a motion-capture system, a camera phone, a projector, a computer workstation, a mainframe computer, a handheld computer, a cellular/mobile phone, a smart appliance, a video player, a DVD writer/player, a television, and other computing devices.

In operation, the electronic device 102 may be pointed by a user in a certain direction such that a scene that includes a plurality of moving objects may lie within a field-of-view (FOV) of the electronic device 102. The electronic device 102 may be utilized by the user to capture the sequence of image frames 104 of the scene in the FOV of the electronic device 102. In some embodiments, the sequence of image frames 104 may refer to a video of a scene as viewed from a viewfinder of an imaging device and captured by one or more users, by use of the electronic device 102. In other embodiments, the sequence of image frames 104 may be a set of distinct image frames captured in sequence after a specific time interval. The sequence of image frames 104 may include a plurality of regions, for example, a first region 112A, and a second region 114A of the current frame 104A and a first region 112B, and a second region 114B of the previous frame 104B.

The captured sequence of image frames 104 may include a plurality of moving objects engaged in motion (in same or different directions) in the scene within the FOV of the electronic device 102. For example, the current frame 104A and the previous frame 104B are of two players engaged in motion in a football match. The first object 108 may be represented by the first region 112A of the current frame 104A, and by the first region 112B of the previous frame 104B. The second object 110 may be represented by the second region 114A of the current frame 104A, and by a second region 114B of the previous frame 104B. Each of the plurality of regions may include a plurality of points, for example, a plurality of points 116 on the first object 108 and the second object 110. Each point may correspond to a position of a pixel or a patch of pixels in the current frame 104A or the previous frame 104B of the sequence of image frames 104. Examples of the plurality of moving objects may include, but are not limited to a human object, an animal, or a non-human or inanimate object, such as a vehicle or a sports item.

At the time of capturing a specific scene, an object-of-interest may be selected by the user for a focused capture from the plurality of moving objects. For example, the first object 108 and the second object 110 in the scene of the football match may be two different objects-of-interest. The objects-of-interest may include an object that may be of interest for the user or desired by the user. Such object-of-interest may be selected for a focused shot in the current frame 104A of the sequence of image frames 104. Thus, the electronic device 102 may be moved by the user such that the movement of the electronic device 102 is aligned with a movement of the object-of-interest, to capture the object-of-interest in a scene. In cases where the object-of-interest is engaged in motion in a certain trajectory, the direction of motion, orientation, elevation, or speed of motion of the electronic device 102 may be changed by the user to follow the motion of the object-of-interest in the current frame. For example, the first object 108 may be selected as a desired object by the user. In such cases, the electronic device 102 may be moved by the user in a direction that is similar to a direction of motion of the first object 108 to focus on and capture the first object 108 in the current frame 104A of the sequence of image frames 104. The first object 108 may be in motion in a certain trajectory. Hence, the orientation or position of the electronic device 102 may be changed by the user to follow the motion of the first object 108.

The intent to focus at a certain point on an object-of-interest in the current frame may be determined by the electronic device 102 based on motion information of the electronic device 102 and the object-of-interest in the previous frame and the current frame. The determined intent to focus at the certain point on the object-of-interest may be utilized by various computational components in the electronic device 102 to estimate an autofocus point in the current frame. The estimated autofocus point may be utilized to control focus of the electronic device 102 at the estimated autofocus point to advantageously facilitate capture of image frames (or shots), by the user, that focus at the estimated autofocus point on the object-of-interest. Different operations that may be executed at the electronic device 102 to estimate the autofocus point in frames captured in real time or near real time from a scene may be hereinafter described.

Initially, the electronic device 102 may be configured to obtain velocity information of the electronic device 102 as the user synchronizes a direction of motion of the electronic device 102 with a direction of motion of an object-of-interest in the sequence of frames. In accordance with an embodiment, the velocity information may be linear velocity information when the electronic device 102 moves linearly along a straight line (in horizontal or vertical plane). In accordance with an embodiment, the velocity information may be angular velocity information when the electronic device 102 turns around a fixed axis with object-of-interest covered in the FOV of the electronic device 102. In accordance with an embodiment, the electronic device 102 may be configured to obtain a combination of the linear and angular velocity information when the electronic device 102 moves along a linear path and turns an axis to focus on an object-of-interest in the FOV of the image sensor.

The electronic device 102 may be further configured to compute a motion vector associated with the electronic device 102. The motion vector may be computed based on at least one of a motion sensor-based motion vector and an optical flow-based motion vector. The motion-sensor-based motion vector associated with the electronic device 102 may be further computed based on the obtained velocity information of the electronic device 102. In certain scenarios, the velocity information of the electronic device 102 may be obtained from a motion sensor of the electronic device 102. The motion sensor included in the electronic device 102 may be a gyroscope based sensor installed in the electronic device 102.

The electronic device 102 may be further configured to generate an optical flow map of the current frame 104A of the sequence of image frames 104. The optical flow map may be generated based on a difference of pixel values of a plurality of pixels in a region of the current frame 104A and a corresponding region of the previous frame 104B of the sequence of image frames 104. The electronic device 102 may be further configured to compute the optical flow-based motion vector associated with the electronic device 102 based on the generated optical flow map. The optical-flow-based motion vector may indicate direction and rate of motion of the electronic device 102 as the orientation of the electronic device 102 may be changed by the user. The electronic device 102 may be configured to compute a motion vector $\vec{V}_{Cam}$ associated with the electronic device 102 based on the optical-flow-based motion vector and the motion-sensor-based motion vector. Such computed motion vector $\vec{V}_{Cam}$ associated with the electronic device 102 may be represented by a mathematical expression (1), given as follows:

$$Movement_{Camera} = \vec{V}_{Cam} \quad (1)$$

The generated optical flow map may include the plurality of regions (such as the first region 112A and the second region 114A), which may correspond to the plurality of moving objects captured in the sequence of image frames 104. The electronic device 102 may be further configured to determine regions in the current image frame that the user tracks. Such regions may be identified based on motion vector information for different regions in the current frames. Thus, the electronic device 102 may be configured to extract a plurality of motion vectors associated with a plurality of points in the current frame from the generated optical flow map. The extracted plurality of motion vectors may be mapped to the plurality of points in the plurality of regions of the current frame 104A. Each of the plurality of extracted motion vectors may be mapped to a different point of the plurality of points of the plurality of regions. A motion vector associated with a point of the plurality of points may indicate a relative motion of the corresponding point with respect to other points of the plurality of points.

For example, the extracted plurality of motion vectors may include a set of motion vectors that may be mapped to a set of points of the first region 112A. In certain scenarios, the plurality of motion vectors associated with the plurality of points 116 in each of the plurality of regions may be computed based on the generated optical flow map. Such computation of the plurality of motion vectors that may be mapped to the plurality of points 116 of the current frame 104A. The plurality of motion vectors may be further determined based on various mathematical functions known to one skilled in the art. Examples of such mathematical functions may include, but are not limited to, a sum of absolute difference (SAD) function, a sum of squared difference (SSD) function, a weighted sum of absolute difference (WSAD) function, and/or a weighted sum of squared difference (WSSD) function.

Notwithstanding, other mathematical functions known in the art may also be implemented for computation of the relative movement of each of a plurality of points in the current frame, without deviation from the scope of the disclosure. The computed relative motion $\vec{V}_{rel}$ of each of the plurality of points may be represented by a mathematical expression (2), given as follows:

$$\text{Movement}_{point} = \vec{V}_{rel} \qquad (2)$$

The electronic device 102 may be further configured to compute an angle between the motion vector $\vec{V}_{Cam}$ associated with the electronic device 102 and each of the plurality of motion vectors that may be mapped to the plurality of points in each of the plurality of regions. For example, the electronic device 102 may be configured to compute a first angle between the motion vector $\vec{V}_{Cam}$ associated with the electronic device 102 and a first motion vector that may be mapped to a point of the first region 112A. In one example, the first angle may be computed based on a first vector sum $\overline{V_{abs\_region}}$ of the motion vector $\vec{V}_{Cam}$ associated with the electronic device 102 and the first motion vector $\vec{V}_{rel}$ associated with the first point 118 of the first region 112A. For example, such computed vector sum $\overline{V_{abs\_region}}$ of a first motion vector $\vec{V}_{rel}$ that is mapped to the first point 118 and the motion vector $\vec{V}_{Cam}$ associated with the electronic device 102, may be represented by a mathematical expression (3), given as follows:

$$\overline{V_{abs\_region}} = \vec{V}_{Cam} + \vec{V}_{rel} \qquad (3)$$

In accordance with an embodiment, the electronic device 102 may be configured to compute a degree-of-similarity between the motion vector $\vec{V}_{Cam}$ associated with the electronic device 102 and each of the plurality of motion vectors. The electronic device 102 may be configured to compute the degree-of-similarity associated with each of the plurality of motion vectors (which may be mapped to the plurality of points), based on a computed angle between the motion vector $\vec{V}_{Cam}$ associated with the electronic device 102 and the respective motion vector. The computed degree-of-similarity associated with each of the plurality of motion vectors may indicate similarity of a direction of motion of the electronic device 102 with respect to a direction of motion of a point to which the respective motion vector may be mapped.

It may be noted that the electronic device 102 may be configured to compute the degree-of-similarity in the direction of the motion of the electronic device 102 and the object-of-interest advantageously using at least one optical flow map for the current frame. Such reduction in computation may cause a reduction in computational time, resource utilization, and battery power utilization of the electronic device 102. Additionally, the lower computational complexity for different frames may improve a speed of execution of other autofocus operation dependent or independent of computation in the electronic device 102.

The electronic device 102 may be configured to detect at least one prominent region in the current frame, for example the first region 112A in the current frame 104A and the first region 112B in the previous frame 104B. In some embodiments, the electronic device 102 may detect a plurality of prominent regions in the current frame. Hereinafter, "the at least one prominent region" and "the plurality of prominent regions" may be interchangeably referred to as "the prominent regions". The prominent regions may have an optical flow similar to a direction of motion of the electronic device 102. The detection of the prominent regions may be done based on threshold criteria (as explained in detail in FIG. 2). The detected prominent regions may include an object-of-interest in the plurality of moving objects in the current frame.

For example, in some embodiments, the electronic device 102 may be configured to detect the first region 112A as the prominent region based on the set of motion vectors associated with a set of points in the first region 112A and the motion vector $\vec{V}_{Cam}$ associated with the electronic device 102. The first region 112A may be mapped to the first object 108. Therefore, the electronic device 102 may identify the first object 108 from the plurality of moving objects based on the detection of the first region 112A as the prominent region. A conventional electronic device may fail to identify the first object 108 from the plurality of moving objects based on the direction of motion of the first region 112A and the direction of motion of the conventional electronic device. Therefore, it is advantageous that the electronic device 102 may be configured to detect the region (such as the first region 112A) of the plurality of regions that has the direction of motion similar to the direction of motion of the electronic device 102.

The electronic device 102 may be further configured to select a region-of-interest from the detected prominent regions in the current frame. Such selection of the region-of-interest may be done based on prior information associated with a tendency of a user to focus in an upper and center portion of the object-of-interest in the detected at least one prominent region. The prior information may implemented in accordance with different rules specified in the composition of photography. Thereafter, the electronic device 102 may be configured to estimate an autofocus point in the detected prominent regions, for example, an autofocus point 118 in the first region 112A of the current frame 104A. The autofocus point may be estimated by computation of a center of mass of a portion of the object-of-interest in the selected region-of-interest from the detected prominent regions. The autofocus point may be identified to be an autofocus position based on at least one of first criteria and second criteria for the estimation of the autofocus point from different candidate autofocus points.

The electronic device 102 may be further configured to control a focus of the image sensor(s) in the electronic device 102 automatically at the estimated autofocus point in the current frame. The focus may be controlled automatically such that the estimated autofocus point may exhibit a minimum deviation from an initialized position for the estimated autofocus point within the detected prominent regions. The initialized position for the estimated autofocus point in the current frame may be derived based on the estimated autofocus point in a previous frame. The deviation in position of two autofocus points in a sequence of two image frames, i.e. the current frame 104A and the previous frame 104B should be minimal to ascertain that the autofocus point is estimated for same prominent region in two sequential image frames. Such controlled focus may facilitate the electronic device 102 to generate markers and visualize an autofocused image frame at a display screen of the electronic device 102 as the user begin to track the motion of the user. The controlled focus may further facilitate the electronic device 102 to predict an intended engagement of the user with an object-of-interest, even before the user renders the object-of-interest into focus. In some embodiments, the control of focus of the electronic device 102 may be utilized to track the object-of-interest in the sequence of image frames 104, for example, the footballer in the first region 112A may be tracked for "900 frames" in a "30 second" video portion of a football match with the footballer in focus. The electronic device 102 may be configured to segment the object-of-interest from the sequence of image frames 104 based on the estimation of the autofocus point in the current frame 104A. The detailed operation of the electronic device 102 has been further explained in detail, for example, in FIG. 2.

Figure 2:
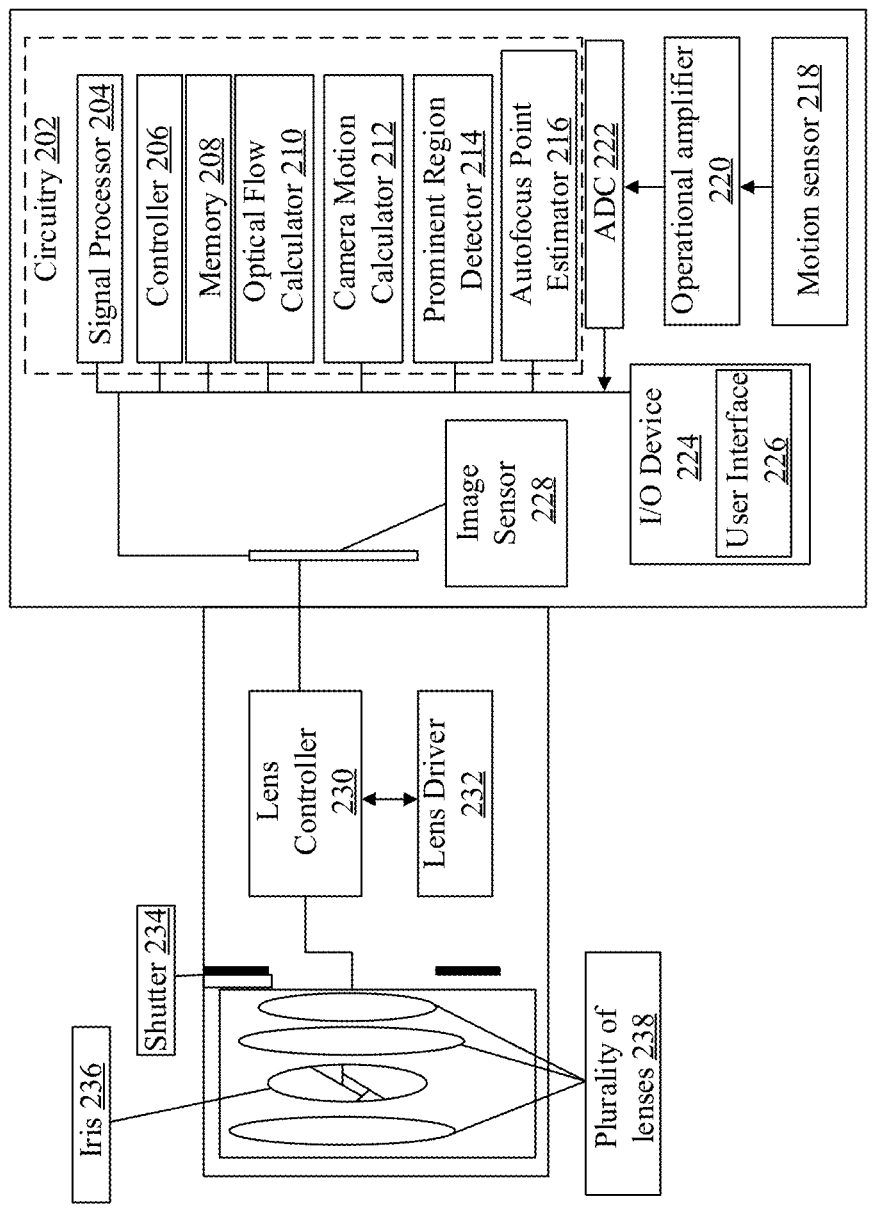
FIG. 2 is a block diagram that illustrates an exemplary electronic device to autofocus on a desired object of a plurality of moving objects within a field-of-view of the electronic device, in accordance with an embodiment of the disclosure.

FIG. 2 is a block diagram that illustrates an exemplary electronic device to autofocus on a desired object within a field of view of the electronic device, in accordance with an embodiment of the disclosure. FIG. 2 is explained in conjunction with elements from FIG. 1. With reference to FIG. 2, there is shown the electronic device 102. The electronic device 102 may include a circuitry 202. The circuitry 202 may include one or more processors, such as a signal processor 204, a controller 206, a memory 208, an optical flow calculator 210, a camera motion calculator 212, a prominent region detector 214, and an autofocus point estimator 216. The electronic device 102 may further include a motion sensor 218, an operational amplifier 220, an analog-to-digital converter (ADC) 222, an input/output (I/O) device 224, and a user interface 226. The electronic device 102 may further include an optical circuitry that may include an image sensor 228, a lens controller 230, a lens driver 232, a shutter 234, an iris 236, and a plurality of lenses 238. The motion sensor 218, the I/O device 224, and the image sensor 228 may be communicatively connected to the circuitry 202. The plurality of lenses 238 may be in connection with the lens controller 230 and the lens driver 232. The lens controller 230 in association with the circuitry 202 may control movement of the plurality of lenses 238.

The signal processor 204 may comprise suitable logic, circuitry, interfaces, and/or code that may be configured to execute a set of instructions stored in the memory 208. The signal processor 204 may be configured to receive the sequence of image frames 104 from the image sensor 228. In one example, the signal processor 204 may be an image processor. The signal processor 204 may be a specialized image processing application processor, implemented based on a number of processor technologies known in the art. Examples of the signal processor 204 may be an X86-based processor, a Reduced Instruction Set Computing (RISC) processor, an Application-Specific Integrated Circuit (ASIC) processor, a Complex Instruction Set Computing (CISC) processor, and/or other hardware processors.

The controller 206 may comprise suitable logic, circuitry, interfaces, and/or code that may be configured to execute a set of instructions stored in the memory 208. The controller 206 may be configured to receive one or more user inputs from the user via the user interface 226. Further, the controller 206 may be configured to store the sequence of image frames 104 received from the image sensor 228 in the memory 208. The controller 206 may be configured to display the sequence of image frames 104 to the user via the I/O device 224. Examples of the controller 206 may be a programmable logic controller (PLC), a microcontroller, an x86-based processor, a RISC processor, an ASIC processor, a CISC processor, and/or other hardware processors.

The memory 208 may comprise suitable logic, circuitry, and/or interfaces that may be configured to store a set of instructions executable by the signal processor 204, the controller 206, the camera motion calculator 212, the optical flow calculator 210, and the prominent region detector 214. The memory 208 may be configured to store the sequence of image frames 104 (for example, the current frame 104A and the previous frame 104B) captured by the electronic device 102. The memory 208 may be further configured to store operating systems and associated applications of the electronic device 102. Examples of implementation of the memory 208 may include, but are not limited to, Random Access Memory (RAM), Read Only Memory (ROM), Hard Disk Drive (HDD), and/or a flash drive.

The optical flow calculator 210 may comprise suitable logic, circuitry, and/or interfaces that may be configured to receive from the memory 208, the sequence of image frames 104, captured by the image sensor 228 of the electronic device 102. The optical flow calculator 210 may be configured to generate an optical flow map based on the current frame 104A in the sequence of image frames 104 and an image frame (such as the previous frame 104B) that lies prior to the current frame 104A in the sequence of image frames 104. The optical flow calculator 210 may be configured to calculate the optical-flow-based motion vector associated with the electronic device 102 based on the generated optical flow map. The optical flow calculator 210 may be configured to compute a plurality of motion vectors associated with a plurality of regions of the current frame 104A, based on the generated optical flow map. The optical flow calculator 210 may be implemented on one of an x86-based processor, a RISC processor, an ASIC processor, a CISC processor, and/or other hardware processors. The optical flow calculator 210 may be implemented as a separate processor or circuitry (as shown) in the electronic device 102. In accordance with an embodiment, the optical flow calculator 210 and the signal processor 204 may be implemented as an integrated processor or a cluster of processors that perform the functions of the optical flow calculator 210 and the signal processor 204.

The camera motion calculator 212 may comprise suitable logic, circuitry, and/or interfaces that may be configured to receive velocity information of the electronic device 102 from the motion sensor 218. The camera motion calculator 212 may be configured to compute a motion-sensor-based motion vector associated with the electronic device 102, based on the received velocity information. The camera motion calculator 212 may be further configured to compute the motion vector $\overrightarrow{V_{Cam}}$ associated with the electronic device 102 based on the optical-flow-based motion vector and the motion-sensor-based motion vector. The camera motion calculator 212 may be implemented on one of an x86-based processor, a RISC processor, an ASIC processor, a CISC processor, and/or other hardware processors. The camera motion calculator 212 may be implemented as a separate processor or circuitry (as shown) in the electronic device 102. In accordance with an embodiment, the camera motion calculator 212 and the signal processor 204 may be implemented as an integrated processor or a cluster of processors that perform the functions of the camera motion calculator 212 and the signal processor 204.

The prominent region detector 214 may comprise suitable logic, circuitry, and/or interfaces that may be configured to detect the prominent regions in the current frame that have an optical flow similar to a direction-of-motion of the electronic device 102, based on a threshold criteria. The prominent region detector 214 may be implemented on one of an x86-based processor, a RISC processor, an ASIC processor, a CISC processor, and/or other hardware processors. The prominent region detector 214 may be implemented as a separate processor or circuitry (as shown) in the electronic device 102. In accordance with an embodiment, the prominent region detector 214 and the signal processor 204 may be implemented as an integrated processor or a cluster of processors that perform the functions of the prominent region detector 214 and the signal processor 204.

The autofocus point estimator 216 may comprise suitable logic, circuitry, and/or interfaces that may be configured to estimate an autofocus point in the detected prominent regions. The autofocus point may be estimated by computation of a center of mass of a portion of an object-of-interest in a selected region-of-interest from the detected prominent regions. The autofocus point estimator 216 may be implemented, for example, one or more of an x86-based processor, a RISC processor, an ASIC processor, a CISC processor, and/or other hardware processors. The autofocus point estimator 216 may be implemented as a separate processor or circuitry (as shown) in the electronic device 102. In accordance with an embodiment, the autofocus point estimator 216 and the signal processor 204 may be implemented as an integrated processor or a cluster of processors that perform the functions of the autofocus point estimator 216 and the signal processor 204.

The motion sensor 218 may comprise suitable logic, circuitry, and interfaces that may be configured to detect a movement (linear or angular) in a device, such as the electronic device 102. For example, the motion sensor 218 may be configured to detect linear velocity information and angular velocity information of the electronic device 102, with variations in an orientation, an elevation, and a speed of movement of the electronic device 102 caused by a user. Examples of implementation of the motion sensor 218 may include, but are not limited to, a gyroscope based sensor, an accelerometer, and/or the like.

The operational amplifier 220 may be configured may comprise suitable logic, circuitry, and interfaces that may be configured to amplify one or more input signals generated by the motion sensor 218. Examples of implementation of the operational amplifier 220 may include, but are not limited to, a field effect transistor (FET), a metaloxide-semiconductor field effect transistor (MOSFET), a complementary metal oxide semiconductor field effect transistor (CMOS) and/or the like.

The ADC 222 may be configured may comprise suitable logic, circuitry, and interfaces that may be configured to receive one or more analog signals from the motion sensor 218. The one or more analog signals may include velocity information associated with the electronic device 102. The ADC 222 may be configured to convert the one or more analog signals into digital signals. Examples of implementation of the ADC 222 may include, but are not limited to, a direct-conversion ADC, a parallel comparator ADC, a counter-type ADC, and/or the like.

The I/O device 224 may comprise suitable logic, circuitry, interfaces, and/or code that may be configured to receive an input from a user. The I/O device 224 may be further configured to provide an output to the user. The I/O device 224 may comprise various input and output devices that may be configured to communicate with the signal processor 204. The I/O device 224 may provide the user interface 226 (such as a touchscreen panel, a keypad, and a voice recognition based on the user interface 226) to the user. Examples of the input devices may include, but is not limited to, a touch screen, a keyboard, a mouse, a joystick, a microphone, and/or an image-capture device. Examples of the output devices may include, but is not limited to a liquid crystal display (LCD) screen and/or a speaker.

The image sensor 228 may comprise suitable circuitry and/or interfaces that may be configured to capture the sequence of image frames 104 of a scene in the FOV of the image sensor 228. Examples of implementation of the image sensor 228 may include, but are not limited to, a Charge-Coupled Device (CCD) image sensor and a Complementary Metal-Oxide-Semiconductor (CMOS) image sensor.

The lens controller 230 may comprise suitable logic, circuitry, and/or interfaces that may be configured to control various characteristics, such as zoom, focus, or the iris 236 or aperture, of the plurality of lenses 238. The lens controller 230 may internally be a part of an imaging unit of the electronic device 102 or may be a stand-alone unit, in conjunction with the controller 206. The lens controller 230 may be implemented by use of several technologies that are well known to those skilled in the art.

The lens driver 232 may comprise suitable logic, circuitry, and/or interfaces that may be configured to perform zoom, focus control, and iris control, based on instructions received from the lens controller 230. The lens driver 232 may be implemented by use of several technologies that are well known to those skilled in the art.

The plurality of lenses 238 may correspond to an optical lens or assembly of lenses used in conjunction with a camera body and mechanism to capture images (such as the sequence of image frames 104) of objects (such as the first object 108). The plurality of lenses 238 may further include the iris 236. The shutter 234 may allow light to pass for a determined period, exposing the image sensor 228 to light in order to capture the sequence of image frames 104.

In operation, the image sensor 228 may be exposed to a plurality of excitations caused by light signals focused at a photosensitive circuit of the image sensor 228 by the plurality of lenses 238. Similarly, the image sensor 228 may capture the sequence of image frames 104 based on a continuous or discontinuous exposure of the plurality of excitations. Additionally, the motion sensor 218 may be further configured to acquire velocity information associated with the motion of the electronic device 102. The image sensor 228 and the motion sensor 218 may be configured to provide the sequence of image frame 104 and the acquired velocity information associated with the electronic device 102 to different components of the circuitry 202.

The optical flow calculator 210 may be configured to generate an optical flow map of the current frame in the captured sequence of image frame. The optical flow map may be generated based on a difference of pixel values of a plurality of pixels in the current frame with respect to the previous frame of the sequence of image frames. The optical flow calculator 210 may be configured to further extract a plurality of motion vectors associated with a plurality of points in the current frame from the generated optical flow map. Such plurality of motion vectors may represent a direction of motion of different regions of the current frame in subsequent frames.

The camera motion calculator 212 may be configured to compute a motion vector associated with the electronic device 102, based on a motion sensor-based motion vector and an optical flow-based motion vector. The motion sensor-based motion vector may be computed based on velocity information obtained from the motion sensor 218 in the electronic device 102, for example, a gyroscopic sensor. Thereafter, the prominent region detector 214 may be configured to compute a plurality of inner products between the motion vector $\vec{V}_{Cam}$ associated with the electronic device 102 and each of the plurality of motion vectors associated with a plurality of points of the current frame 104A. A computed inner product of a motion vector associated with each of the plurality of points and the motion vector associated with the electronic device 102 may represents a likelihood-of-prominence value associated with the respective point. A set of computed inner products from the plurality of computed inner products may be mapped to a set of points in the current frame (for example, points in the first region 112A in FIG. 1).

In certain scenarios, the prominent region detector 214 may be configured to compute the set of inner products between the motion vector $\vec{V}_{Cam}$ associated with the electronic device 102 and one or more vector sums (such as the computed vector sum $\vec{V}_{abs\_region}$). In certain scenarios, the one or more vector sums may be computed between the motion vector $\vec{V}_{Cam}$ associated with the electronic device 102 and each of the set of motion vectors that may be mapped to the set of points. A first computed inner product $I_{point}$ between the first computed vector sum $\vec{V}_{abs\_region}$ and the second motion vector $\vec{V}_{Cam}$ may be represented by the mathematical expression (4), given as follows:

$$I_{point} = \vec{V}_{Cam} \cdot \vec{V}_{abs\_region} \qquad (4)$$

The prominent region detector 214 may be configured to generate a threshold value from the computed plurality of inner products based on a maximum of the computed plurality of inner products. In accordance with an embodiment, the threshold value may be determined based on computation of a histogram of likelihood of prominence values from the computed plurality of inner products. A maximum from the likelihood of prominence values may be searched within the determined histogram. The threshold value may be a fraction (or a specific percentage) of the maximum value of computed inner product, for example, the threshold value may be "3.5" as a fraction "0.7" of the maximum value of "5" from the computed plurality of inner products. The prominent region detector 214 may be configured to determine whether a computed inner product associated with a motion vector at a point in the current frame is greater than the threshold value for the plurality of inner products. The determination based on the threshold value for the plurality of inner products may be threshold criteria for the detection of prominent regions in the current frame.

The prominent region detector 214 may be configured to detect the prominent regions in the current frame that have an optical flow similar to a direction-of-motion of the electronic device 102. Such detection of the prominent regions in the current frame may be done based on the threshold criteria. The prominent regions may be detected in the current frame based on selection of the plurality of points from the current frame that have an inner product value greater than the computed threshold value. The detected prominent regions may include an object-of-interest in the plurality of moving objects.

The autofocus point estimator 216 may be configured to select a region-of-interest from the detected prominent regions in the current frame. The selection of the region-of-interest may be done based on prior information associated with a tendency of a user to focus in an upper and center portion of the object-of-interest in the detected at least one prominent region. The region-of-interest may be selected based on a search for a maximum coordinate value and a minimum coordinate value from a set of coordinates that satisfy the threshold criteria. A boundary may be further computed to decide whether regions bound by the coordinates in the search results are most prominent regions.

The autofocus point estimator 216 may be configured to estimate a candidate autofocus point in the detected prominent regions. The candidate autofocus point may be estimated by computation of a center of mass of a portion of the object-of-interest in the selected region-of-interest, from the detected prominent regions. The computation of the center of mass of the portion of the object-of-interest in the selected region-of-interest of the detected prominent regions may be done based on the plurality of computed inner products associated with a plurality of points in the detected prominent regions.

For example, the autofocus point estimator 216 may be configured to determine a center of mass $C_{(x,y)}$ of the detected first region 112A. The center of mass $C_{(x,y)}$ may be computed based on the set of computed inner products, which may be mapped to the set of points of the detected first region 112A. The center of mass $C_{(x,y)}$ may be computed further based on "X" coordinates and "Y" coordinates of the set of points of the detected first region 112A in a two dimensional "X"-"Y" plane. For example, an "X" coordinate of each point of the set of points may be represented by a first term "$x_i$". A "Y" coordinate of each point of the set of points may be represented by a second term "$y_j$". Further, the center of mass of the detected first region 112A may be represented by a third term "$I_{i,j}$". In such cases, the center of mass $C_{(x,y)}$ of the detected first region 112A may be represented by a mathematical expression (5), given as follows:

$$C_{(x,y)} = \left( \frac{\sum_{j}^{H}\sum_{i}^{W} x_i I_{i,j}}{\sum_{i}^{W} x_i}, \frac{\sum_{j}^{H}\sum_{i}^{W} y_j I_{i,j}}{\sum_{i}^{W} y_j} \right) \quad (5)$$

The autofocus point estimator 216 may be configured to further determine whether the computed center of mass of the portion of the object-of-interest in the selected region-of-interest is present in the detected prominent regions. The determination of a presence of the center of mass in the detected prominent regions may be first criteria for the estimation of the autofocus point in the detected prominent regions. A new candidate autofocus point may be searched when the computed center of mass is present outside of the detected prominent regions. The autofocus point estimator 216 may be configured to further search for a new candidate autofocus point that is separated by a minimum distance from the candidate autofocus point to the detected at least one prominent region.

The autofocus point estimator 216 may be configured to determine whether a distance between the candidate autofocus point for the current frame and a candidate autofocus point in a previous frame is less than a threshold distance. The determination based on the threshold distance is second criteria for the estimation of the autofocus point in the detected prominent regions. For example, the autofocus point estimator 216 may be configured to determine whether the candidate autofocus point 118 is located within a defined distance from the determined center of mass $C_{(x,y)}$ of the detected first region 112A. In cases where, the candidate autofocus point 118 is within the defined distance from the determined center of mass $C_{(x,y)}$, the candidate autofocus point 118 may be estimated as the actual autofocus position.

The candidate autofocus point may be the estimated autofocus point in the detected prominent regions, in accordance with at least one of the first criteria and the second criteria. Alternatively stated, the autofocus point estimator 216 may be configured to ascertain the estimated autofocus point as the candidate autofocus point in the detected prominent regions when the candidate autofocus point satisfies at least one of the first criteria and the second criteria.

The lens controller 230 may be configured to control a focus of the image sensor 228 automatically at the estimated autofocus point in the current frame. The focus may be controlled such that the estimated autofocus point may exhibit a minimum deviation from an initialized position for the estimated autofocus point within the detected prominent regions. For example, the lens controller 230 may control focus of the plurality of lenses 238 on the image sensor 228 at the autofocus point 118 on the object-of-interest in the first region 112A during capture of a scene of a football match in the FOV of the image sensor 228. In some embodiments, the signal processor 204 may be further configured to segment the object-of-interest from the sequence of image frames 104 based on the detected prominent regions and the estimated autofocus point. Different exemplary scenarios for the implementation of the electronic device 102 and autofocus point estimation has been further described in detail, for example, in FIG. 3A to FIG. 3F.

Figure 3A:
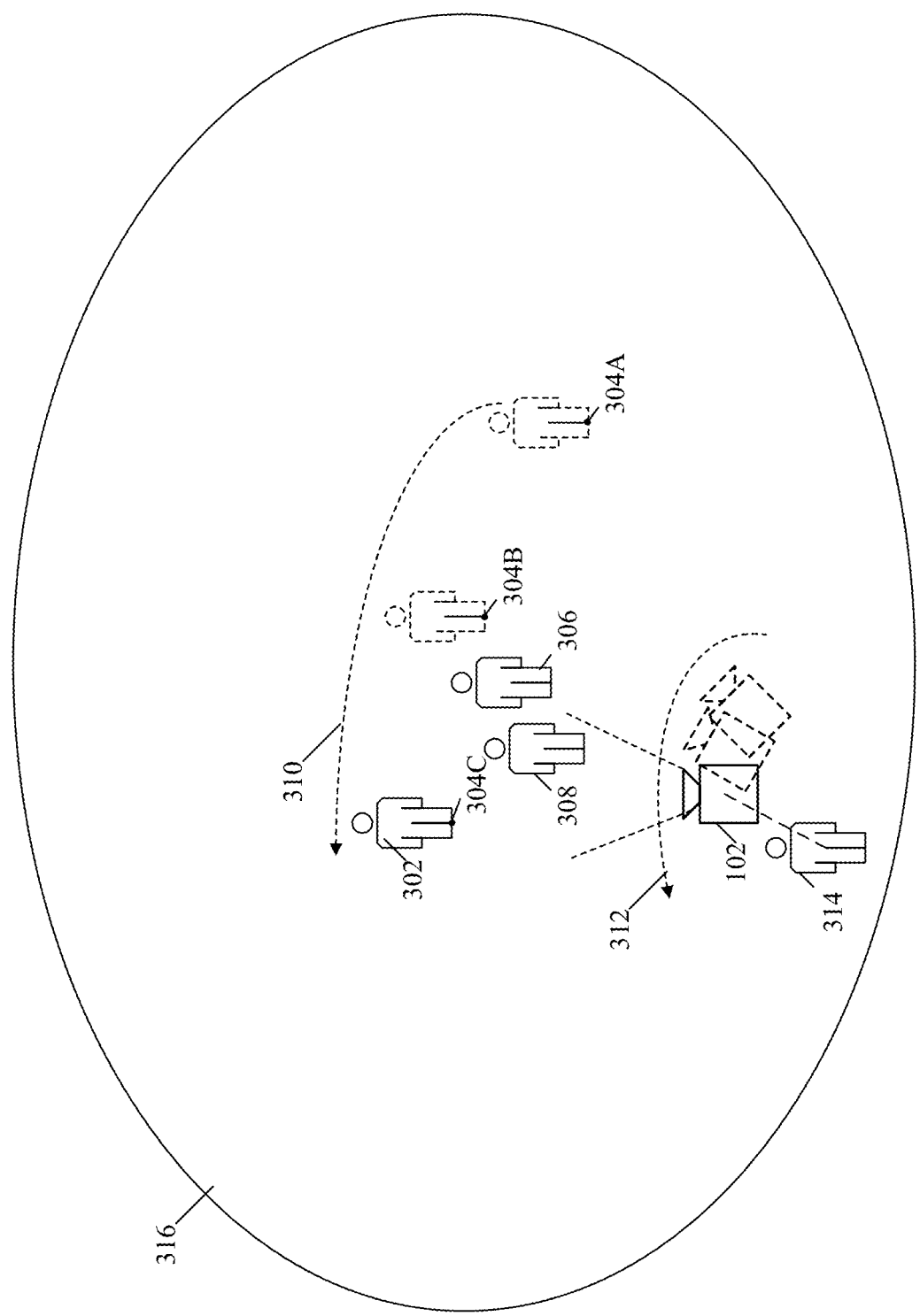
FIG. 3A illustrates a first exemplary scenario for implementation of electronic device to autofocus on a desired object of a plurality of moving objects within a field-of-view of the electronic device, in accordance with an embodiment of the disclosure.

FIG. 3A illustrates an exemplary scenario for implementation of electronic device to autofocus on a desired object of a plurality of moving objects within a field-of-view of the electronic device, in accordance with an embodiment of the disclosure. FIG. 3A is explained in conjunction with elements from FIG. 1 and FIG. 2. With reference to FIG. 3A, there is shown the electronic device 102, a plurality of objects that includes a first object 302, a second object 306, and a third object 308. The electronic device 102 may be operated by a user 314. The electronic device 102, the first object 302, the second object 306, the third object 308, and the user 314 may be located in a defined area 316, for example, a football ground. The first object 302 and the second object 306 may correspond to the first object 108 (of FIG. 1) and the second object 110 (of FIG. 1), respectively.

In accordance with the exemplary scenario, the plurality of moving objects may be in motion within the defined area 316. The first object 302, which may be initially located at a first position 304A, may move to a second position 304B, and thereafter, to a third position 304C. The first object 302 may move in a first direction of motion (represented by a first arrow 310) to move from the first position 304A to the third position 304C. In certain scenarios, the user 314 may desire to capture an object of the plurality of moving objects by use of the electronic device 102. For example, the user 314 may desire to capture the first object 302. In such a scenario, the user 314 may change orientation or position of the electronic device 102 to include the first object 302 within a field-of-view of the electronic device 102. The user 314 may change orientation or position of the electronic device 102 in a second direction of motion (represented by a second arrow 312 in FIG. 3A). In cases where the first direction of motion is similar to the second direction of motion, the electronic device 102 may identify the first object 302 as an object that the user 314 may desire to capture by use of the electronic device 102.

Figure 3B:
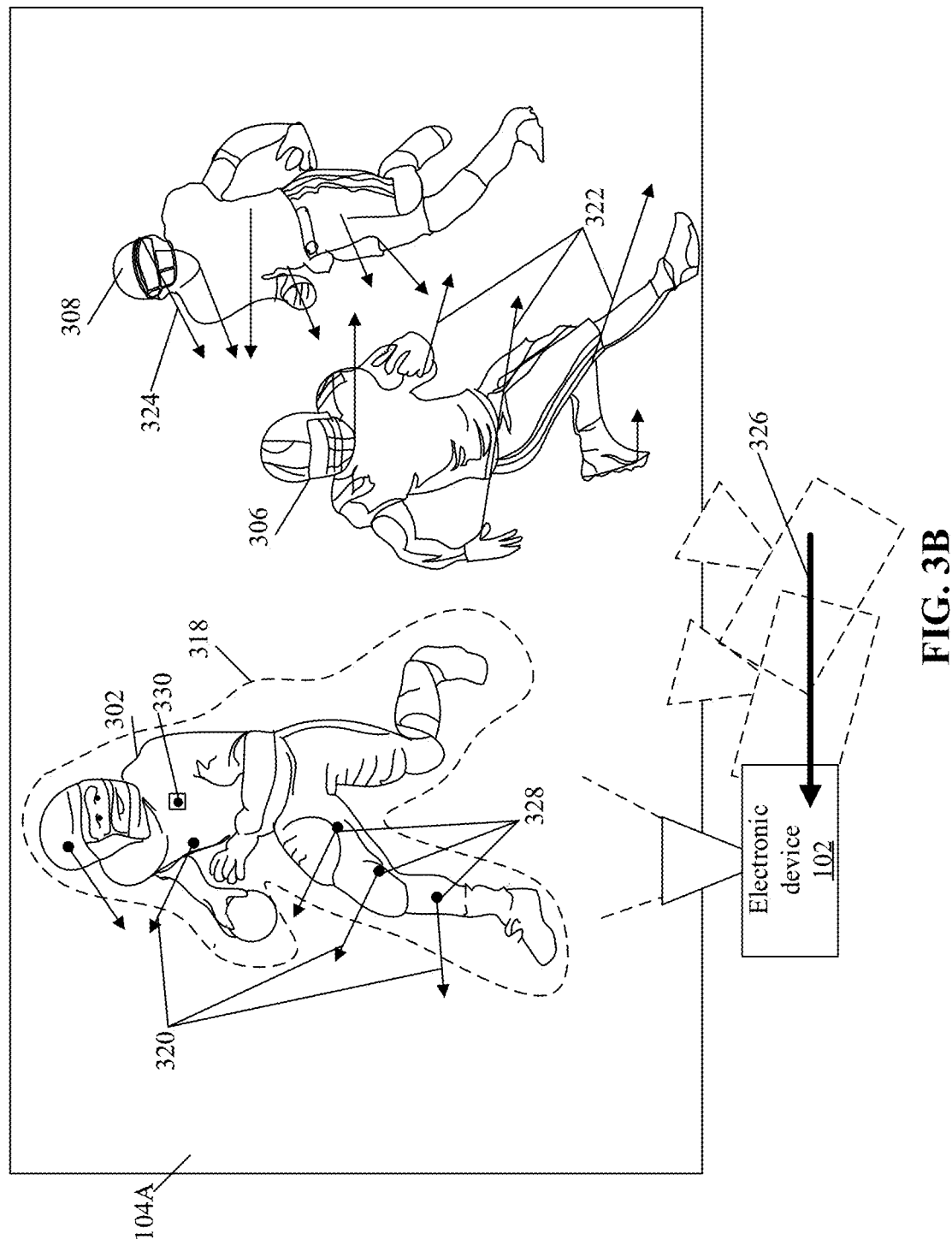
FIG. 3B illustrates a second exemplary scenario for implementation of an electronic device to autofocus on a desired object of a plurality of moving objects within a field-of-view of the electronic device, in accordance with an embodiment of the disclosure.

FIG. 3B illustrates a second exemplary scenario for implementation of electronic device to autofocus on a desired object of a plurality of moving objects within a field-of-view of the electronic device, in accordance with an embodiment of the disclosure. FIG. 3B is explained in conjunction with elements from FIGS. 1, 2, and 3A. With reference to FIG. 3B, there is shown the current frame 104A of the sequence of image frames 104 captured by the electronic device 102. The current frame 104A includes the first object 302, the second object 306, and the third object 308. The first object 302 may be represented in the current frame 104A as a first region 318. The first region 318 of the current frame 104A may correspond to the first region 112A (of FIG. 1).

In accordance with an embodiment, the electronic device 102 may be configured to generate the optical flow map associated with the current frame 104A, as discussed in FIG. 1. Further, the electronic device 102 may be configured to extract a plurality of motion vectors associated with a plurality of points (such as the plurality of points 116 of FIG. 1) in the current frame 104A, based on the generated optical flow map. The plurality of points may comprise a set of points 328 in the first region 318. A first set of motion vectors (represented by a first set of arrows 320 as shown in FIG. 3B) may be mapped to the set of points 320 of the first region 318. Similarly, a second set of motion vectors (represented by a second set of arrows 322 as shown) and a third set of motion vectors (represented by a third set of arrows 324 as shown) may be associated with one or more points of regions which may represent the second object 306 and the third object 308 respectively. Each of the first set of motion vectors (represented by the first set of arrows 320 as shown in FIG. 3B) may indicate relative motion of a different point of the set of points 328 in comparison with other points of the set of points 328. The first set of motion vectors (represented by the first set of arrows 320 as shown in FIG.

3B) may further indicate a direction of motion of the first region 318 in comparison to other regions of the plurality of regions.

In accordance with an embodiment, the electronic device 102 may be further configured to compute the motion vector $\overrightarrow{V_{Cam}}$ (represented by a first arrow 326 as shown) associated with the electronic device 102 based on the generated optical flow map, as discussed in FIG. 1. The motion vector $\overrightarrow{V_{Cam}}$ (represented by the first arrow 326) may indicate a direction of motion of the electronic device 102 as a user changes orientation or position of the electronic device 102 to capture motion of one or more desired objects (such as the first object 302). In cases where the direction of motion of a region of the plurality of regions is similar to the direction of motion of the electronic device 102, the electronic device 102 may detect the respective region as a region-of-prominence. For example, the direction of motion of the first region 318 may be similar to the direction of motion of the electronic device 102. In such cases, the electronic device 102 may detect the first region 318 as the region-of-prominence (or the prominent region).

Figure 3C:
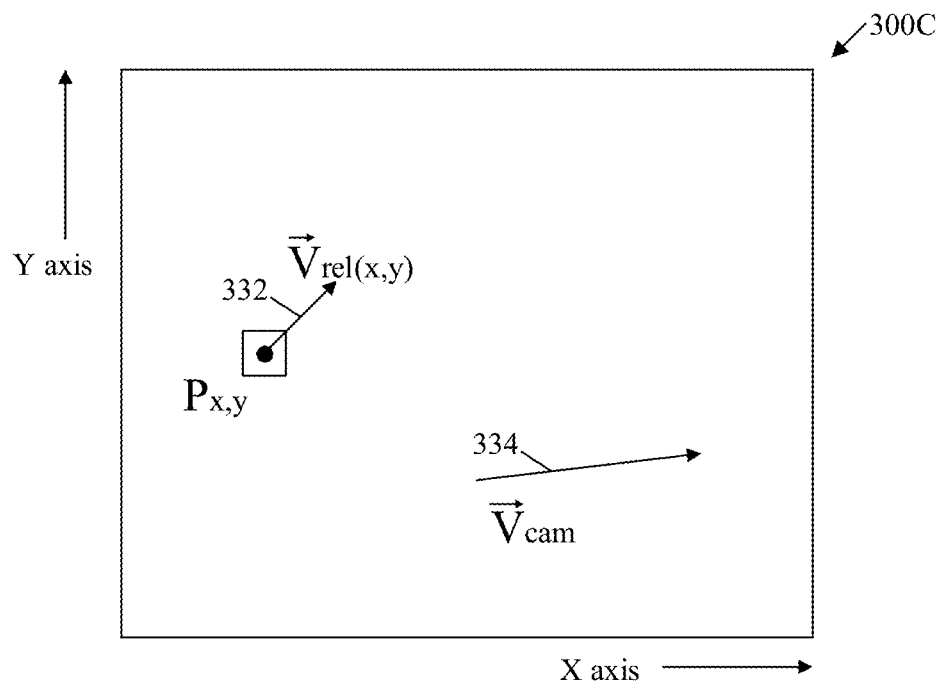
FIG. 3C is a first graph that illustrates motion of a first motion vector associated with a region of a current frame of a sequence of image frames, and a second motion vector associated with an electronic device in a two dimensional "x"-"y" plane, in accordance with an embodiment of the disclosure.

FIG. 3C is a first graph that illustrates motion of a first motion vector associated with a region of a current frame of a sequence of image frames, and a second motion vector associated with an electronic device 102 in a two dimensional plane, in accordance with an embodiment of the disclosure. FIG. 3C is explained in conjunction with elements from FIGS. 1, 2, 3A, and 3B. With reference to FIG. 3C, there is shown a first graph 300C which depicts a first motion vector $\overrightarrow{V_{rel}}$ (represented by a graph component 332) and a second motion vector $\overrightarrow{V_{Cam}}$ (represented by a graph component 334) in a two dimensional "X"-"Y" plane. The first motion vector $\overrightarrow{V_{rel}}$ (represented by the graph component 332) may be indicative of motion of a point P(x, y) (such as the autofocus point 118 of FIG. 1) of the plurality of points 116 (of FIG. 1), in the two dimensional "X"-"Y" plane. Similarly, the second motion vector $\overrightarrow{V_{Cam}}$ (represented by graph component 334) may be indicative of the motion vector $\overrightarrow{V_{Cam}}$ (represented by the first arrow 326 in FIG. 3B) associated with the electronic device 102 in the two dimensional "X"-"Y" plane. An "X" axis of the first graph 300C depicts displacement of the point P(x, y) and the electronic device 102 in an "X" direction of the two dimensional "X"-"Y" plane. A "Y" axis of the first graph 300C depicts displacement of the point P(x, y) and the electronic device 102 in a "Y" direction of the two dimensional "X"-"Y" plane.

Figure 3D:
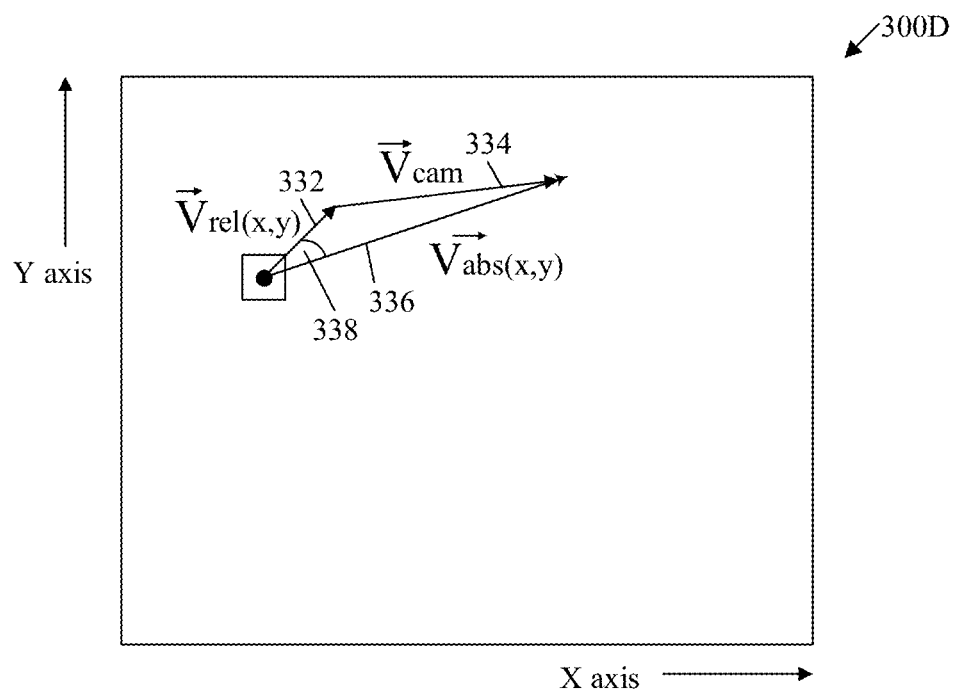
FIG. 3D is a second graph that illustrates motion of a first motion vector associated with a region of a current frame of a sequence of image frames, and a second motion vector associated with an electronic device in a two dimensional "x"-"y" plane, in accordance with an embodiment of the disclosure.

FIG. 3D is a second graph that illustrates motion of a first motion vector associated with a region of a current frame of a sequence of image frames, and a second motion vector associated with an electronic device 102 in a two dimensional plane, in accordance with an embodiment of the disclosure. FIG. 3D is explained in conjunction with elements from FIGS. 1, 2, 3A, and 3C. With reference to FIG. 3D, there is shown a second graph 300D, which depicts the first motion vector $\overrightarrow{V_{rel}}$ (represented by the graph component 332) and the second motion vector $\overrightarrow{V_{Cam}}$ (represented by the graph component 334) in the two dimensional "X"-"Y" plane. There is further shown a vector sum $\overrightarrow{V_{abs\_region}}$ (represented by a third graph component 336) of the first motion vector $\overrightarrow{V_{rel}}$ (represented by the graph component 332) and the second motion vector $\overrightarrow{V_{Cam}}$ (represented by the graph component 334).

The first motion vector $\overrightarrow{V_{rel}}$ (represented by the graph component 332) may be indicative of motion of the point P(x, y), in the two dimensional "X"-"Y" plane. Similarly, the second motion vector $\overrightarrow{V_{Cam}}$ (represented by graph component 334) may be indicative of motion of the electronic device 102 in the two dimensional "X"-"Y" plane. An "X" axis of the second graph 300D depicts displacement of the point P(x, y) and the electronic device 102 in an "X" direction of the two dimensional "X"-"Y" plane. A "Y" axis of the first graph 300C depicts displacement of the point P(x, y) and the electronic device 102 in a "Y" direction of the two dimensional "X"-"Y" plane.

In accordance with an embodiment, the electronic device 102 may be configured to compute an angle between the motion vector associated with the electronic device 102 and each of the plurality of motion vectors. For example, the electronic device 102 may be configured to compute an angle "θ" (represented by a fourth graph component 338) between the first motion vector $\overrightarrow{V_{rel}}$ (represented by the graph component 332) and the second motion vector $\overrightarrow{V_{Cam}}$ (represented by the graph component 334). Such computed angle "θ" (represented by the fourth graph component 334) between the first motion vector $\overrightarrow{V_{rel}}$ (represented by graph component 332) and the second motion vector $\overrightarrow{V_{Cam}}$ (represented by the graph component 334) may be represented by the a mathematical expression (6), given as follows:

$$\theta = \cos^{-1}\left(\frac{\overrightarrow{V_{abs\_region}} \cdot \overrightarrow{V_{Cam}}}{|\overrightarrow{V_{abs\_region}}| \cdot |\overrightarrow{V_{Cam}}|}\right) \quad (6)$$

Figure 3E:
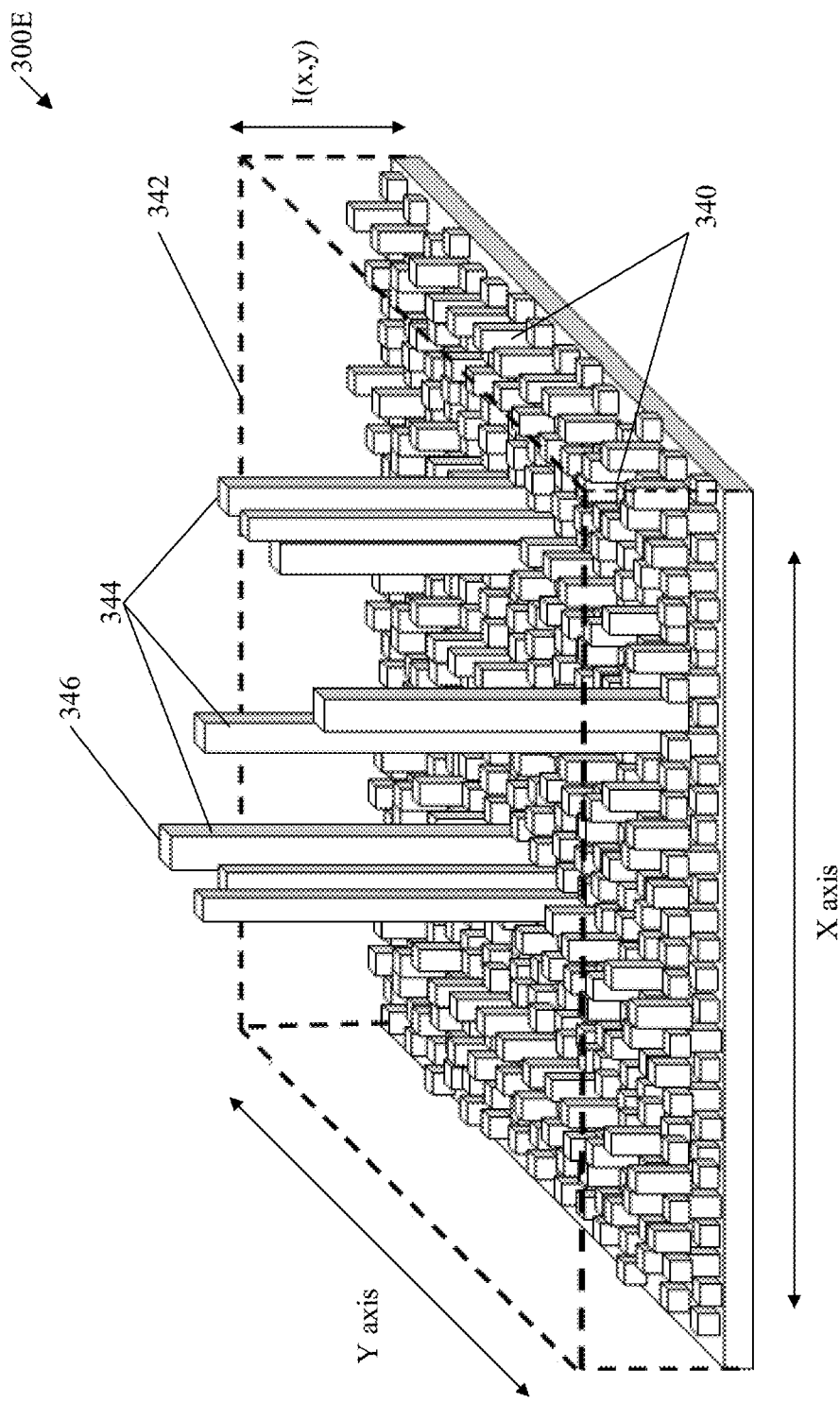
FIG. 3E is a histogram that illustrates variation of a computed inner product of a first motion vector and a second motion vector with respect to the second motion vector, in accordance with an embodiment of the disclosure.

FIG. 3E is a histogram that illustrates a computed inner product associated with a plurality of points in a two dimensional plane, in accordance with an embodiment of the disclosure. FIG. 3E is explained in conjunction with elements from FIGS. 1, 2, 3A, 3B, 3C, and 3D. With reference to FIG. 3E, there is shown a histogram 300E, which depicts a computed inner product (such as the computed inner products $I_{point}$ that may be mapped to the plurality of points 116 of FIG. 1) for each of the plurality of points 116 (of FIG. 1). An "X" axis and a "Y" axis of the histogram 300E depicts the two dimensional "X"-"Y" plane that corresponds to a two dimensional plane of the current frame 104A (FIG. 1). Each point on the two dimensional "X"-"Y" plane corresponds to a different point of the plurality of points 116 of FIG. 1. A "Z" axis of the histogram 300E corresponds to the computed inner products $I_{point}$ (represented by a plurality of histogram components 340) which may be mapped to each of the plurality of points 116 (of FIG. 1).

The autofocus point estimator 216 may be configured to determine a highest computed inner product (represented by a histogram component 346) from the plurality of computed inner products for the plurality of points 116 (of FIG. 1). Further, the autofocus point estimator 216 may be configured to determine a threshold value of computed inner product (represented by the histogram component 342), based on the determined highest computed inner product (represented by the histogram component 346). The autofocus point estimator 216 may be configured to identify a set of points (represented by the histogram components 344) that may have computed inner products greater than the threshold value of the computed inner products.

Figure 3F:
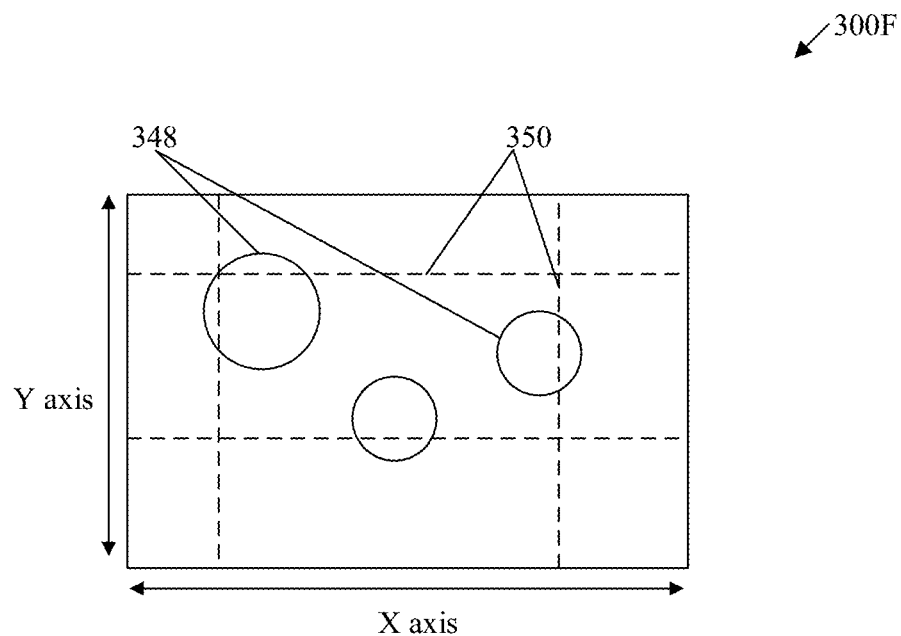
FIG. 3F is a third graph that illustrates variation of a computed inner product of a first motion vector and a second motion vector with respect to the second motion vector, in accordance with an embodiment of the disclosure.

FIG. 3F is a third graph that illustrates a plurality of points of a current frame of a sequence of image frames, in accordance with an embodiment of the disclosure. FIG. 3F is explained in conjunction with elements from FIGS. 1, 2, 3A, 3B, 3C, 3D, and 3E. With reference to FIG. 3F, there is shown a third graph 300F, which depicts a current frame (such as the current frame 104A of FIG. 1). An "X" axis and a "Y" axis of the third graph 300F depicts the two dimensional "X"-"Y" plane that corresponds to a two dimensional plane of the current frame. The prominent region detector 214 may be configured to detect the prominent regions (represented by a set of circles 348) based on a threshold criteria, as discussed in FIG. 1, 2, and FIG. 3E. The prominent region detector 214 may be configured to select a region-of-interest (represented by a graph component 350) from the detected prominent regions in the current frame (as discussed in FIGS. 1 and 2).

Figure 3G:
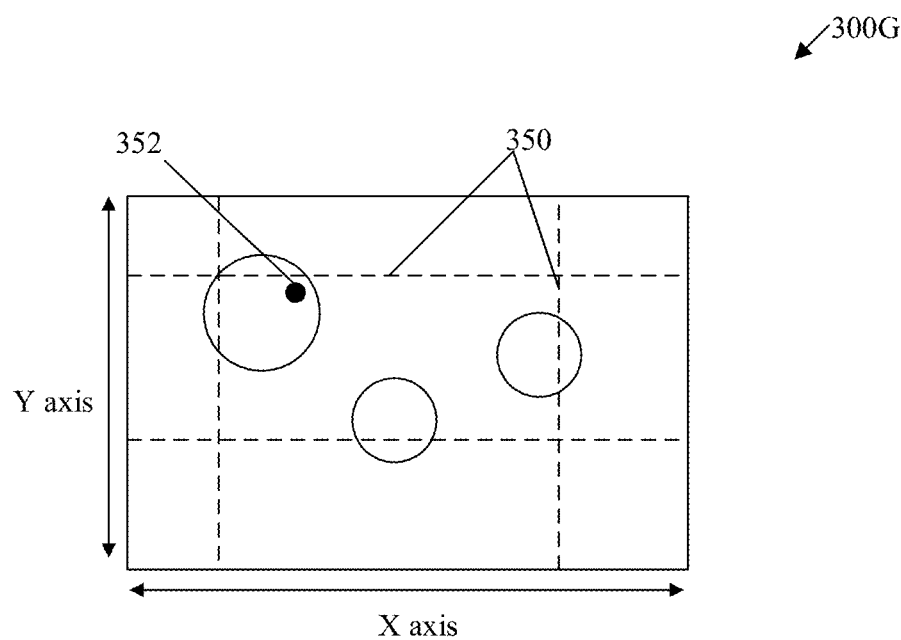
FIG. 3G is a fourth graph that illustrates variation of a computed inner product of a first motion vector and a second motion vector with respect to the second motion vector, in accordance with an embodiment of the disclosure.

FIG. 3G is a fourth graph that illustrates a plurality of points of a current frame of a sequence of image frames, in accordance with an embodiment of the disclosure. FIG. 3G is explained in conjunction with elements from FIGS. 1, 2, 3A, 3B, 3C, 3D, 3E, and 3F. With reference to FIG. 3G, there is shown a fourth graph 300G, which depicts a current frame (such as the current frame 104A of FIG. 1). An "X" axis and a "Y" axis of the histogram 300E depicts the two dimensional "X"-"Y" plane that corresponds to a two dimensional plane of the current frame 104A (FIG. 1). The autofocus point estimator 216 may be configured to estimate an autofocus point (such as the autofocus point 118 of FIG. 1) as an AF position (represented by a graph component 352) based on computation of a center of mass of a portion of the object-of-interest in the selected region-of-interest from the detected prominent regions.

Figure 4A:
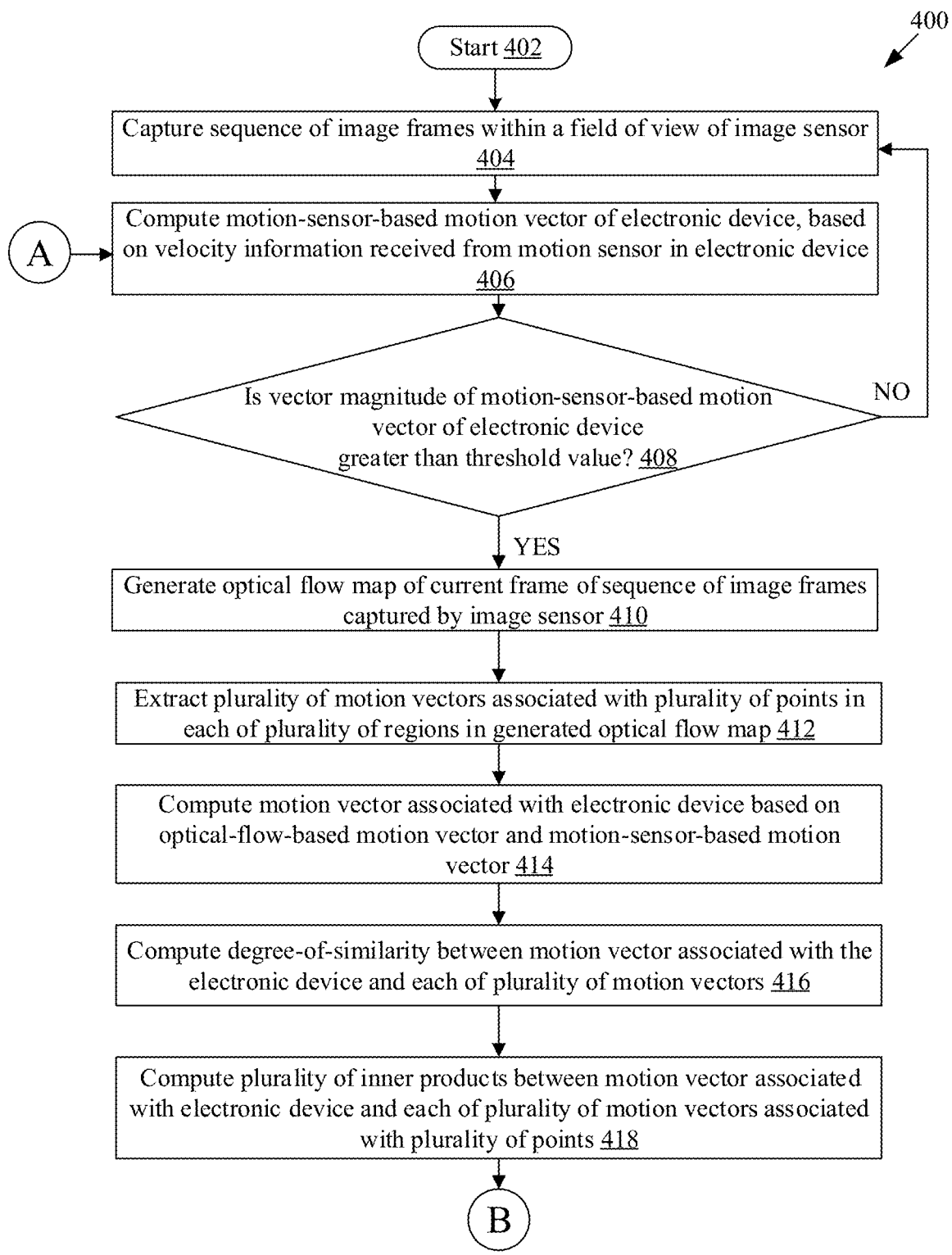
FIGS. 4A, 4B, and 4C, collectively, depict a flowchart that illustrates an exemplary method to autofocus on a desired object of a plurality of moving objects within a field-of-view of the electronic device, in accordance with an embodiment of the disclosure.
Figure 4B:
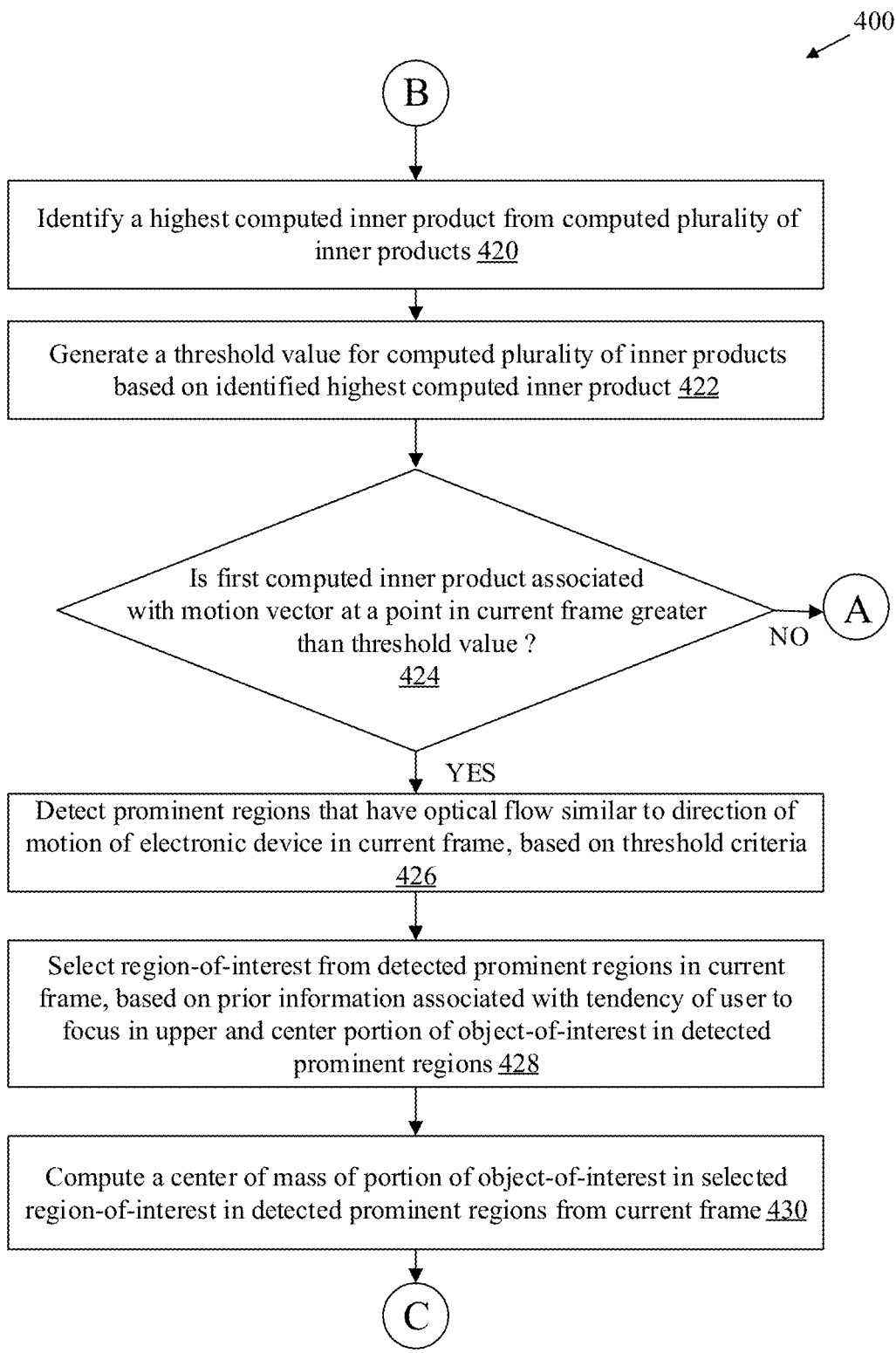
Figure 4C:
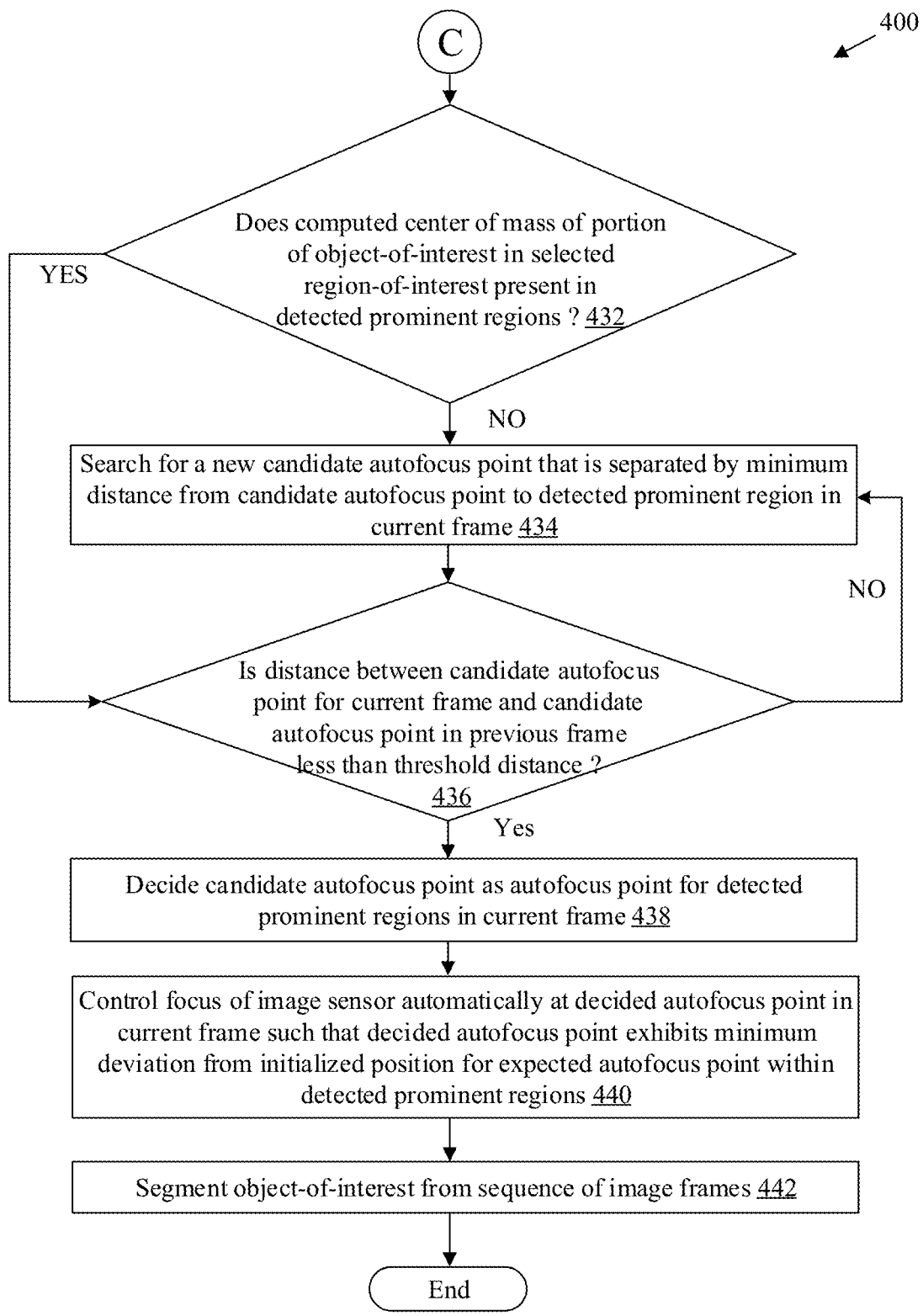

FIGS. 4A, 4B, and 4C, collectively, depict a flowchart that illustrates an exemplary method to track a desired object in a sequence of image frames based on optical flow information and motion sensor data, in accordance with an embodiment of the disclosure. With reference to FIG. 4A, there is shown a flow chart 400. The flow chart 400 is described in conjunction with FIGS. 1, 2, 3A, 3B, 3C, 3D, 3E, 3F, and 3G. The method starts at 402 and proceeds to 404.

At 404, a sequence of image frames 104 may be captured within a field-of-view of the image sensor 228. The image sensor 228 of the electronic device 102 may be configured to capture the sequence of image frames 104. For example, the electronic device 102 may be pointed, by the user, at a certain direction such that the plurality of moving objects may be within the field-of-view of the electronic device 102. The electronic device 102 may be utilized, by the user, to capture the sequence of image frames 104 that includes a current frame 104A and a previous frame 104B. The captured sequence of image frames 104 may comprise the plurality of moving objects, as discussed in FIG. 1.

At 406, a motion-sensor-based motion vector associated with the electronic device 102 may be computed based on velocity information associated with the electronic device 102. The motion sensor 218 of the electronic device 102 may be configured to compute the velocity information associated with the motion of the electronic device 102. Additionally, the motion sensor 218 may be configured to compute the motion-sensor-based motion vector associated with the electronic device 102.

At 408, it may be determined whether vector magnitude of the motion-sensor-based motion vector associated with the electronic device 102 is greater than a threshold value. The signal processor 204 may be configured to determine whether the vector magnitude of the motion-sensor-based motion vector associated with the electronic device 102 is greater than the threshold value. In a case where the motion-sensor-based motion vector is greater than the threshold value, the control may pass to step 410. Otherwise, control may pass to step 404.

At 410, an optical flow map of the current frame 104A of the sequence of image frames 104 may be generated. The optical flow calculator 210 may be configured to generate the optical flow map. The optical flow map may be generated based on a difference of pixel values of a plurality of pixels in a region of the current frame 104A and a corresponding region of the previous frame 104B of the sequence of image frames 104. The generated optical flow map may include a plurality of regions (such as the first region 112A and the second region 114A), which may correspond to the plurality of moving objects captured in the sequence of image frames 104.

At 412, a plurality of motion vectors associated with a plurality of points in each of the plurality of regions may be extracted from the generated optical flow map. The optical flow calculator 210 may be configured to extract the plurality of motion vectors, as discussed in FIG. 1. The one or more motion vectors associated with a region of the plurality of regions may indicate a relative motion of the respective region in comparison with other regions of the plurality of regions. For example, the plurality of motion vectors may include a set of motion vectors associated with the first region 112A. The electronic device 102 may be configured to compute an optical-flow-based motion vector associated with the electronic device 102 based on the generated optical flow map. The optical-flow-based motion vector may indicate direction and rate of an angular motion of the electronic device 102 as the user changes the orientation of the electronic device 102.

At 414, a motion vector associated with the electronic device 102 may be computed based on the optical-flow-based motion vector and the motion-sensor-based motion vector. The camera motion calculator 212 may be configured to compute the motion vector associated with the electronic device 102, based on the optical-flow-based motion vector and the motion-sensor-based motion vector.

At 416, a degree-of-similarity of the motion vector associated with the electronic device 102 and each of the plurality of motion vectors may be computed. The signal processor 204 may be configured to compute the degree-of-similarity associated with the electronic device 102 and each of the plurality of motion vectors. In accordance with an embodiment, the electronic device 102 may be configured to compute an angle between the motion vector associated with the electronic device 102 and each of the plurality of motion vectors of the plurality of regions. The electronic device 102 may be configured to compute the degree-of-similarity associated with each of the plurality of motion vectors (of the plurality of regions), based on the computed angle between the motion vector associated with the electronic device 102 and the respective motion vector. The electronic device 102 may be further configured to compute a ratio between the motion vector associated with the electronic device 102 and each of the plurality of motion vectors.

At 418, a plurality of inner products between the motion vector associated with the electronic device 102 and each of the plurality of motion vectors associated with the plurality of points 116 may be computed. The signal processor 204 of the electronic device 102 may be configured to compute the plurality of inner products between the motion vector associated with the electronic device 102 and each of the plurality of motion vectors associated with the plurality of points 116, as discussed in FIG. 1.

At 420, a highest computed inner product from the computed plurality of inner products may be identified. The prominent region detector 214 may be configured to identify the highest computed inner product from the computed plurality of inner products that may be mapped to the set of points in the current frame.

At 422, a threshold value for the computed plurality of inner products may be generated based on the identified highest computed inner product. The prominent region detector 214 may be configured to generate the threshold value for the computed plurality of inner products based on the identified highest computed inner product.

At 424, it may be determined whether a computed inner product associated with a motion vector at a point in the current frame is greater than the threshold value for the plurality of inner products. The prominent region detector 214 may be configured to determine whether a computed inner product $I_{point}$, is greater than the threshold value. In a case where the computed inner product $I_{point}$, is greater than the threshold value, the control may pass to 426. Otherwise, control may pass to 406. The determination based on the threshold value for the plurality of inner products is the threshold criteria for the detection of the prominent regions in the current frame.

At 426, prominent regions that have an optical flow similar to the direction of motion of the electronic device 102 may be detected in the current frame, based on threshold criteria. The prominent region detector 214 may be configured to detect the prominent regions in the current frame that have an optical flow similar to the direction of motion of the electronic device 102. The detection may be done based on the threshold criteria.

At 428, a region-of-interest may be selected from the detected prominent regions in the current frame, based on prior information associated with a tendency of a user to focus in an upper and center portion of the object-of-interest in the detected prominent regions. The prominent region detector 214 may be configured to select a region-of-interest from the detected prominent regions in the current frame. Such selection may be done, based on prior information associated with a tendency of a user to focus in an upper and center portion of the object-of-interest in the detected prominent regions.

At 430, a center of mass of a portion of the object-of-interest in the selected region-of-interest in the detected prominent regions may be computed from the current frame. The autofocus point estimator 216 may be configured to determine a center of mass of a portion of the object-of-interest in the selected region-of-interest in the detected prominent regions, from the current frame. For example, the center of mass $C_{(x,y)}$ may be detected in the first region 112A. The center of mass $C_{(x,y)}$ may be computed based on the set of computed inner products that may be mapped to the set of points of the detected first region 112A, as discussed in FIG. 2. The computed center of mass of the portion of the object-of-interest in the selected region-of-interest may be a candidate autofocus point.

At 432, it may be determined whether the computed center of mass of the portion of the object-of-interest in the selected region-of-interest is present in the detected prominent regions. The autofocus point estimator 216 may be configured to determine whether the computed center of mass of the portion of the object-of-interest in the selected region-of-interest is present in the detected prominent regions. In a case where the computed center of mass lies within the detected prominent regions, the control passes to 436. Otherwise, the control passes to 434. The determination of a presence of the center of mass in the detected at least one prominent region is the first criteria for the estimation of the autofocus point in the detected at least one prominent region.

At 434, a new candidate autofocus point that is separated by a minimum distance from the candidate autofocus point to the detected prominent region may be searched in the current frame. The autofocus point estimator 216 may be configured to search for a new candidate autofocus point that is separated by a minimum distance from the candidate autofocus point to the detected prominent region in the current frame. The new candidate autofocus point may be searched when the computed center of mass is present outside of the detected at least one prominent region.

At 436, it may be determined whether a distance between the candidate autofocus point for the current frame and a candidate autofocus point in a previous frame is less than a threshold distance. The autofocus point estimator 216 may be configured to determine whether a distance between the candidate autofocus point for the current frame and a candidate autofocus point in a previous frame is less than a threshold distance. In a case where the distance between the candidate autofocus point for the current frame and the candidate autofocus point in the previous frame is less than a threshold distance, control passes to 438. Otherwise, control passes to 434. The determination based on the threshold distance is the second criteria for the estimation of the autofocus point in the detected prominent regions.

At 438, the candidate autofocus point may be decided as the autofocus point for the detected prominent regions in the current frame. The autofocus point estimator 216 may be configured to decide the candidate autofocus point as the autofocus point for the detected prominent regions in the current frame.

At 440, a focus of the image sensor 228 may be controlled automatically at the decided autofocus point in the current frame such that the decided autofocus point exhibits a minimum deviation from an initialized position for the estimated autofocus point within the detected prominent regions. The lens controller 230 may be configured to control a focus of the image sensor 228 automatically at the decided autofocus point in the current frame such that the decided autofocus point exhibits a minimum deviation from an initialized position for the estimated autofocus point within the detected prominent regions.

At 442, the object-of-interest may be segmented from the sequence of image frames 104. The signal processor 204 may be configured to segment the object-of-interest from the sequence of image frames 104. Control passes to end.

In accordance with an embodiment, an electronic device is disclosed. The electronic device (such as the electronic device 102 of FIG. 1) comprises an image sensor (the image sensor 228 of FIG. 2) and circuitry (the circuitry 202 of FIG. 2). The image sensor 228 may be configured to capture a sequence of image frames (such as the sequence of image frames 104 of FIG. 1) which includes a current frame (such as the current frame 104A of FIG. 1). The current frame 104A comprises a plurality of regions which may be mapped to a plurality of moving objects (e.g. the first object 108 and the second object 110 of FIG. 1) within a field-of-view of the image sensor 228. The circuitry 202 is configured to detect at least a first region (such as the first region 112A of FIG. 1) in the current frame 104A that has a direction of motion similar to that of the electronic device 102. The first region 112A corresponds to a desired object (e.g. the first object 108) of the plurality of moving objects. The circuitry 202 may be configured to identify a point (such as the autofocus point 118 of FIG. 1) of the detected first region 112A, as an auto-focus position. The circuitry may be configured to control focus of the image sensor 228 automatically on the desired object, based on the identification of the autofocus point 118 of the current frame 104A as the auto-focus position, to track the desired object in the sequence of image frames 104.

Various embodiments of the disclosure may provide a non-transitory computer readable medium and/or storage medium, and/or a non-transitory machine-readable medium and/or storage medium having stored thereon, a machine code and/or a set of instructions executable by a machine, such as the electronic device, and/or a computer. The set of instructions in the electronic device may cause the machine and/or computer to perform the operations that comprise capture of a sequence of image frames by an image sensor. The operations may further comprise detection of at least a first region in the current frame that has a direction of motion similar to that of the electronic device. The first region corresponds to a desired object of the plurality of moving objects. The operations further comprise identification of a first point of the detected first region, as an auto-focus position. The operations further comprise control of focus of the image sensor automatically on the desired object, based on the identification of the first point of the current frame as the auto-focus position, to track the desired object in the sequence of image frames. The operations when performed may enhance the functioning of the electronic device or the computer itself.

The following described implementations may be found in the disclosed electronic device to auto-focus on a desired object of a plurality of moving objects within a field-of-view of the electronic device. Exemplary aspects of the disclosure may include an electronic device that may comprise an image sensor and a circuitry. The image sensor may be configured to capture a sequence of image frames which includes a current frame. The current frame comprises a plurality of regions which corresponds to a plurality of moving objects within a field-of-view of the image sensor. The electronic device may be configured to determine an intent of a user to focus at a certain point on an object-of-interest in a frame, based on motion information of the electronic device and the object-of-interest in a previous frame and a current frame. The determined intent to focus at the certain point on the object-of-interest may be utilized by various computational components in the electronic device to estimate an autofocus point in the current frame. The estimated autofocus point may be further utilized to control focus of the electronic device at the estimated autofocus point to facilitate capture of image frames (or shots) that focus at the estimated autofocus point on the object-of-interest. The electronic device may be configured to control a focus of the image sensor(s) in the electronic device automatically at the estimated autofocus point in the current frame. The focus may be controlled automatically such that the estimated autofocus point may exhibit a minimum deviation from an initialized position for the estimated autofocus point within the detected prominent regions. The initialized position for the estimated autofocus point in the current frame may be derived based on the estimated autofocus point in a previous frame. Such controlled focus may facilitate the electronic device to generate markers and visualize an autofocused image frame at a display screen of the electronic device as the user begin to track the motion of an object-of-interest. The controlled focus may further facilitate the electronic device to predict an intended engagement of the user with an object-of-interest, even before the object-of-interest is focused. A conventional electronic device may fail to identify an object-of-interest from the plurality of moving objects based on the optical flow of different regions in the current frame and the direction of motion of the conventional electronic device. Therefore, the electronic device may detect prominent regions that have a direction of motion similar to the direction of motion of the electronic device. The electronic device may be configured to compute a degree-of-similarity in the direction of the motion of the electronic device and the object-of-interest using at least one optical flow map for the current frame. A reduced number of optical flow map computations may facilitate a reduction in computational time for autofocus point, resource utilization, and power utilization of the electronic device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   an image sensor configured to capture a sequence of image frames which includes a current frame, wherein the current frame comprises a plurality of regions which corresponds to a plurality of moving objects within a field-of-view of the image sensor; and
   circuitry configured to:
   detect at least one prominent region in the current frame having an optical flow similar to a direction of motion of the electronic device, based on a threshold criteria, wherein the detected at least one prominent region comprises an object-of-interest in the plurality of moving objects;
   select a region-of-interest from the detected at least one prominent region in the current frame, based on prior information associated with a tendency of a user to focus in an upper and center portion of the object-of-interest in the detected at least one prominent region;

estimate an autofocus point in the detected at least one prominent region, wherein the autofocus point is estimated by computation of a center of mass of a portion of the object-of-interest in the selected region-of-interest from the detected at least one prominent region; and control a focus of the image sensor automatically at the estimated autofocus point in the current frame such that the estimated autofocus point exhibits a minimum deviation from an initialized position for the estimated autofocus point within the detected at least one prominent region.

2. The electronic device of claim 1, wherein the circuitry is further configured to generate an optical flow map of the current frame based on a difference of pixel values of a plurality of pixels in the current frame with respect to a previous frame of the sequence of image frames.

3. The electronic device of claim 2, wherein the circuitry is further configured to compute a motion vector associated with the electronic device, based on an optical flow-based motion vector and a motion-sensor-based motion vector.

4. The electronic device of claim 3, wherein the circuitry is further configured to compute the motion-sensor-based motion vector, based on velocity information obtained from a motion sensor in the electronic device, and wherein the motion sensor is a gyroscope based sensor.

5. The electronic device of claim 4, the circuitry is further configured to extract from the generated optical flow map, a plurality of motion vectors associated with a plurality of points in the detected at least one prominent region.

6. The electronic device of claim 5, wherein the circuitry is further configured to compute a plurality of inner products between the motion vector associated with the electronic device and each of the plurality of motion vectors associated with the plurality of points in the detected at least one prominent region, and wherein a computed inner product of a motion vector associated with each of the plurality of points and the motion vector associated with the electronic device represents a likelihood-of-prominence value associated with the respective point.

7. The electronic device of claim 6, wherein the circuitry is further configured to generate a threshold value from the computed plurality of inner products based on a maximum of the computed plurality of inner products.

8. The electronic device of claim 7, wherein the circuitry is further configured to determine whether a computed inner product associated with a motion vector at a point in the current frame is greater than the threshold value of inner product, and wherein the determination based on the threshold value of inner product is the threshold criteria for the detection of the at least one prominent region in the current frame.

9. The electronic device of claim 7, wherein the at least one prominent region is detected in the current frame based on selection of the plurality of points from the current frame that have an inner product value greater than the computed threshold value.

10. The electronic device of claim 1, wherein the region-of-interest is selected based on a search of a minimum and maximum of coordinates of the detected at least one prominent region.

11. The electronic device of claim 1, wherein the computation of the center of mass of the portion of the object-of-interest in the selected region-of-interest in the detected at least one prominent region is based on a plurality of computed inner products associated with a plurality of points in the detected at least one prominent region.

12. The electronic device of claim 11, wherein the computed center of mass of the portion of the object-of-interest in the selected region-of-interest is a candidate autofocus point.

13. The electronic device of claim 12, wherein the circuitry is further configured to determine whether the computed center of mass of the portion of the object-of-interest in the selected region-of-interest is present in the detected at least one prominent region, and wherein the determination of the presence of the center of mass in the detected at least one prominent region is a first criteria for the estimation of the autofocus point in the detected at least one prominent region.

14. The electronic device of claim 12, wherein the circuitry is further configured to search for a new candidate autofocus point that is separated by a minimum distance from the candidate autofocus point to the detected at least one prominent region, and wherein the new candidate autofocus point is searched when the computed center of mass is present outside of the detected at least one prominent region.

15. The electronic device of claim 12, wherein the circuitry is further configured to determine whether a distance between the candidate autofocus point for the current frame and a candidate autofocus point in a previous frame is less than a threshold distance, wherein the determination based on the threshold distance is a second criteria for the estimation of the autofocus point in the detected at least one prominent region.

16. The electronic device of claim 12, wherein the candidate autofocus point is the estimated autofocus point in accordance with at least one of a first criteria and a second criteria.

17. The electronic device of claim 1, wherein the circuitry is further configured to segment the object-of-interest from the sequence of image frames based on the detected at least one prominent region and the estimated autofocus point.

18. A method, comprising:
in an electronic device comprising an image sensor and a circuitry:
capturing, by the image sensor, a sequence of image frames which includes a current frame, wherein the current frame comprises a plurality of regions which corresponds to a plurality of moving objects within a field-of-view of the image sensor;

detecting, by the circuitry, at least one prominent region in the current frame having an optical flow similar to a direction of motion of the electronic device, based on a threshold criteria, wherein the detected at least one prominent region comprises an object-of-interest in the plurality of moving objects;

selecting, by the circuitry, a region-of-interest from the detected at least one prominent region in the current frame, based on prior information associated with a tendency of a user to focus in an upper and center portion of the object-of-interest in the detected at least one prominent region;

estimating, by the circuitry, an autofocus point in the detected at least one prominent region, wherein the autofocus point is estimated by computation of a center of mass of a portion of the object-of-interest in the selected region-of-interest from the detected at least one prominent region; and controlling, by the circuitry, a focus of the image sensor automatically at the estimated autofocus point in the current frame such that the estimated autofocus point exhibits a minimum deviation from an initialized position for the estimated autofocus point within the detected at least one prominent region.

19. The method of claim 18, further comprising generating, by the circuitry, an optical flow map of the current frame based on a difference of pixel values of a plurality of pixels in the current frame with respect to a previous frame of the sequence of image frames.

20. The method of claim 19, further comprising computing, by the circuitry, a motion vector associated with the electronic device, based on an optical flow-based motion vector and a motion sensor-based motion vector.

* * * * *